(12) United States Patent
Fritz et al.

(10) Patent No.: US 8,550,555 B2
(45) Date of Patent: Oct. 8, 2013

(54) CHILD RESTRAINT FOR VEHICLE

(75) Inventors: Ward Fritz, Chelsea, MA (US);
Andrew W. Marsden, Hingham, MA (US); Walter Bezaniuk, Berkley, MA (US); Joe Langley, Foxboro, MA (US); Eric Hyman, South Grafton, MA (US)

(73) Assignee: Cosco Management, Inc., Wilmington, DE (US)

( * ) Notice: Subject to any disclaimer, the term of this patent is extended or adjusted under 35 U.S.C. 154(b) by 397 days.

(21) Appl. No.: 12/840,082

(22) Filed: Jul. 20, 2010

(65) Prior Publication Data
US 2011/0272983 A1    Nov. 10, 2011

Related U.S. Application Data

(60) Provisional application No. 61/331,254, filed on May 4, 2010.

(51) Int. Cl.
A47D 1/10    (2006.01)
(52) U.S. Cl.
USPC ..................... 297/253; 297/256.16
(58) Field of Classification Search
USPC ..................... 297/253, 250.1, 256.16, 256.14
See application file for complete search history.

(56) References Cited

U.S. PATENT DOCUMENTS

| | | | |
|---|---|---|---|
| 958,249 A | 5/1910 | Hirsh | |
| 1,825,016 A | 9/1931 | Salisbury | |
| 2,326,328 A | 8/1943 | Bush | |
| 3,136,579 A | 6/1964 | Hunter | |
| 3,510,151 A | 5/1970 | Weman | |
| RE29,841 E | * 11/1978 | Wener | 297/256.13 |
| 4,387,489 A | 6/1983 | Dudek | |
| 4,660,889 A | 4/1987 | Anthony et al. | |
| 4,796,919 A | 1/1989 | Linden | |
| 4,854,639 A | 8/1989 | Burleigh et al. | |
| 4,893,835 A | 1/1990 | Linden | |
| 5,000,481 A | 3/1991 | Willson | |
| 5,186,520 A | 2/1993 | Whitaker et al. | |
| 5,236,221 A | 8/1993 | Minami | |
| 5,277,472 A | 1/1994 | Freese et al. | |
| 5,579,561 A | 12/1996 | Smith et al. | |
| 5,611,596 A | 3/1997 | Barley et al. | |
| 5,653,003 A | 8/1997 | Freeman | |
| 5,671,971 A | 9/1997 | Koyanagi et al. | |
| 5,695,243 A | * 12/1997 | Anthony et al. | 297/250.1 |

(Continued)

FOREIGN PATENT DOCUMENTS

EP    1369296    12/2003
EP    1407922    4/2004

(Continued)

OTHER PUBLICATIONS

Office Action from related Chinese Patent Application No. 201020662980.9 dated May 10, 2011, 4 pages.

(Continued)

Primary Examiner — Milton Nelson, Jr.
(74) Attorney, Agent, or Firm — Barnes & Thornburg LLP

(57) ABSTRACT

A child restraint includes a base, a seat, and an anchor belt. The anchor belt holds the base in place on a passenger seat of a vehicle. The seat mounts on the base and supports a child or infant for travel in the vehicle above the base.

31 Claims, 16 Drawing Sheets

(56) References Cited

U.S. PATENT DOCUMENTS

| | | | |
|---|---|---|---|
| 5,839,789 A | 11/1998 | Koledin | |
| 5,845,372 A | 12/1998 | Smith et al. | |
| 6,024,408 A * | 2/2000 | Bello et al. | 297/250.1 |
| 6,152,528 A | 11/2000 | van Montfort | |
| 6,247,208 B1 | 6/2001 | Creech | |
| 6,318,799 B1 | 11/2001 | Greger et al. | |
| 6,390,562 B1 | 5/2002 | Takamizu et al. | |
| 6,471,298 B2 | 10/2002 | Carine et al. | |
| 6,508,510 B2 | 1/2003 | Yamazaki | |
| 6,626,493 B2 | 9/2003 | Kain | |
| 6,672,664 B2 | 1/2004 | Yanaka et al. | |
| 6,695,400 B2 | 2/2004 | Washizuka et al. | |
| 6,779,842 B2 | 8/2004 | McNeff | |
| 6,854,415 B2 | 2/2005 | Barnes et al. | |
| 7,029,068 B2 * | 4/2006 | Yoshida et al. | 297/250.1 |
| 7,059,676 B2 | 6/2006 | McNeff | |
| 7,163,265 B2 | 1/2007 | Adachi | |
| 7,195,315 B2 | 3/2007 | Rikhof | |
| 7,216,932 B2 | 5/2007 | Emmert | |
| 7,325,871 B2 | 2/2008 | Gangadharan et al. | |
| 7,926,874 B2 * | 4/2011 | Hendry | 297/256.16 |
| 7,988,230 B2 * | 8/2011 | Heisey et al. | 297/250.1 |
| 2002/0043838 A1 | 4/2002 | Yanaka et al. | |
| 2002/0062543 A1 | 5/2002 | Dittmar et al. | |
| 2003/0151286 A1 | 8/2003 | Kain | |
| 2005/0110318 A1 | 5/2005 | Meeker et al. | |
| 2005/0184567 A1 | 8/2005 | Carpenter et al. | |
| 2005/0253431 A1 | 11/2005 | Hei et al. | |
| 2005/0264062 A1 | 12/2005 | Longenecker et al. | |
| 2006/0006714 A1 | 1/2006 | Van Geer et al. | |
| 2006/0091709 A1 | 5/2006 | Emmert | |
| 2006/0261650 A1 | 11/2006 | Billman et al. | |
| 2006/0261651 A1 | 11/2006 | Nolan et al. | |
| 2007/0069060 A1 | 3/2007 | Maciejczyk | |

FOREIGN PATENT DOCUMENTS

| | | |
|---|---|---|
| EP | 1623868 | 2/2006 |
| EP | 1741593 | 1/2007 |
| NL | 193778 | 10/1996 |
| WO | 2004033251 | 4/2004 |

OTHER PUBLICATIONS

Office Action from related Chinese Patent Application No. 201020662976.2 dated May 16, 2011, 3 pages.

* cited by examiner

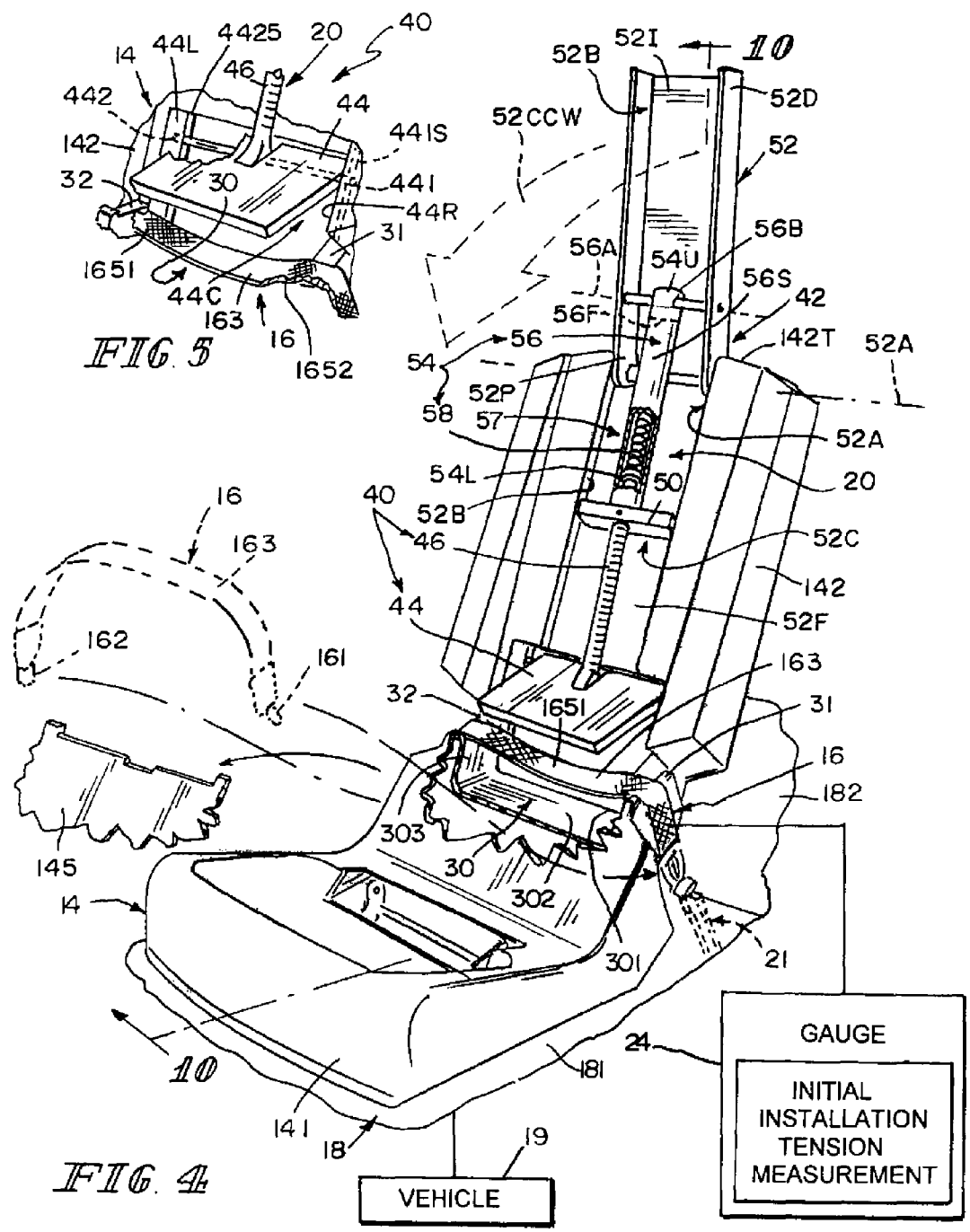

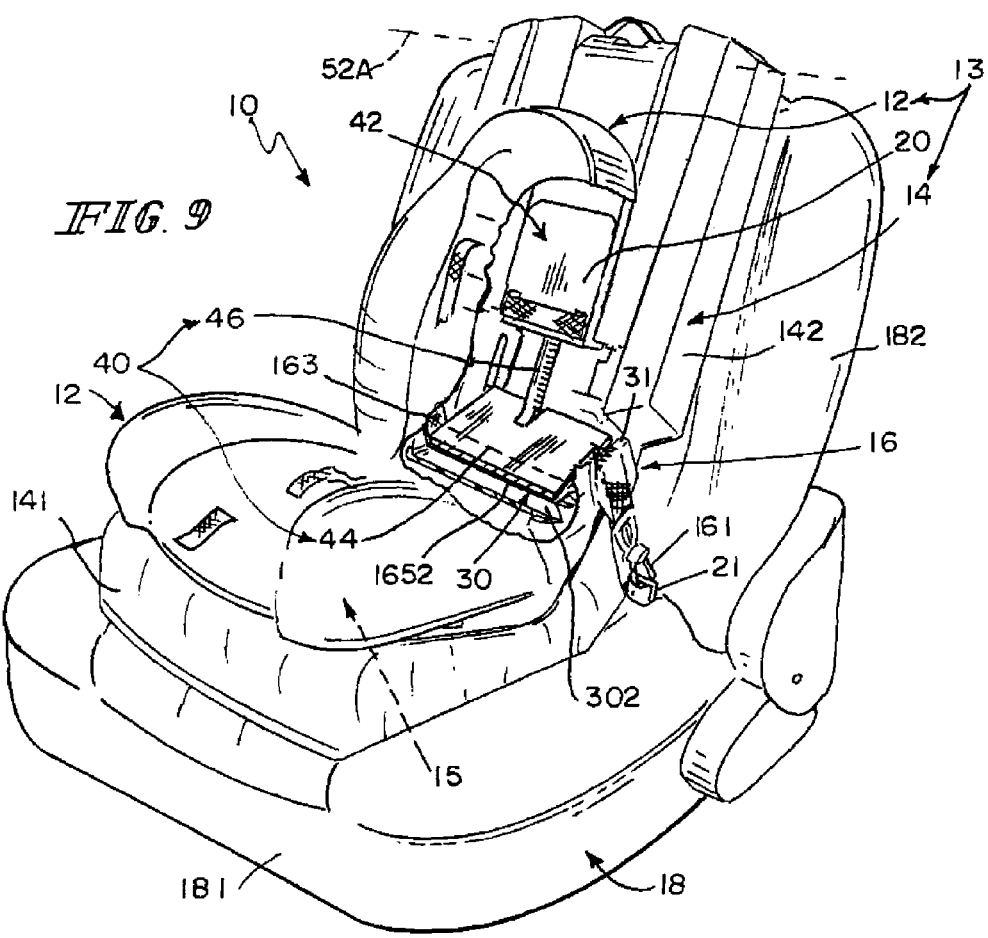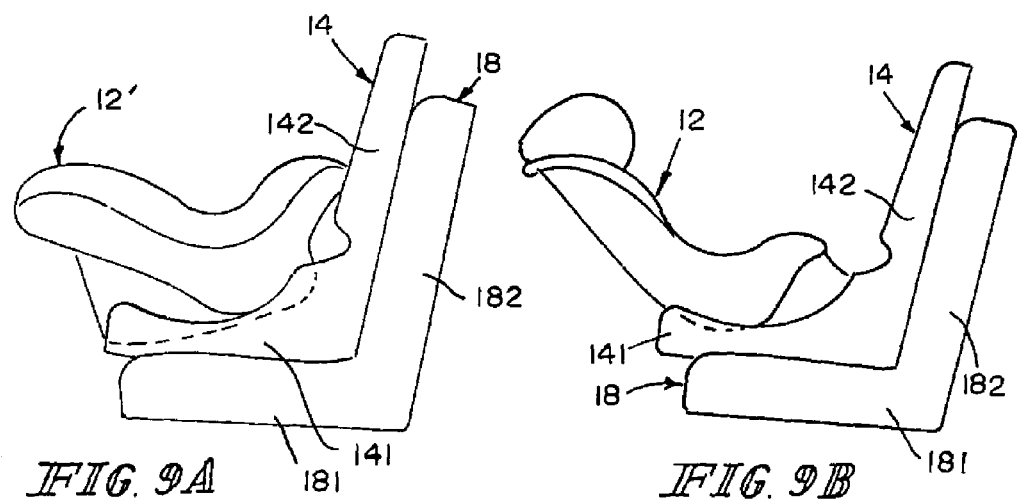

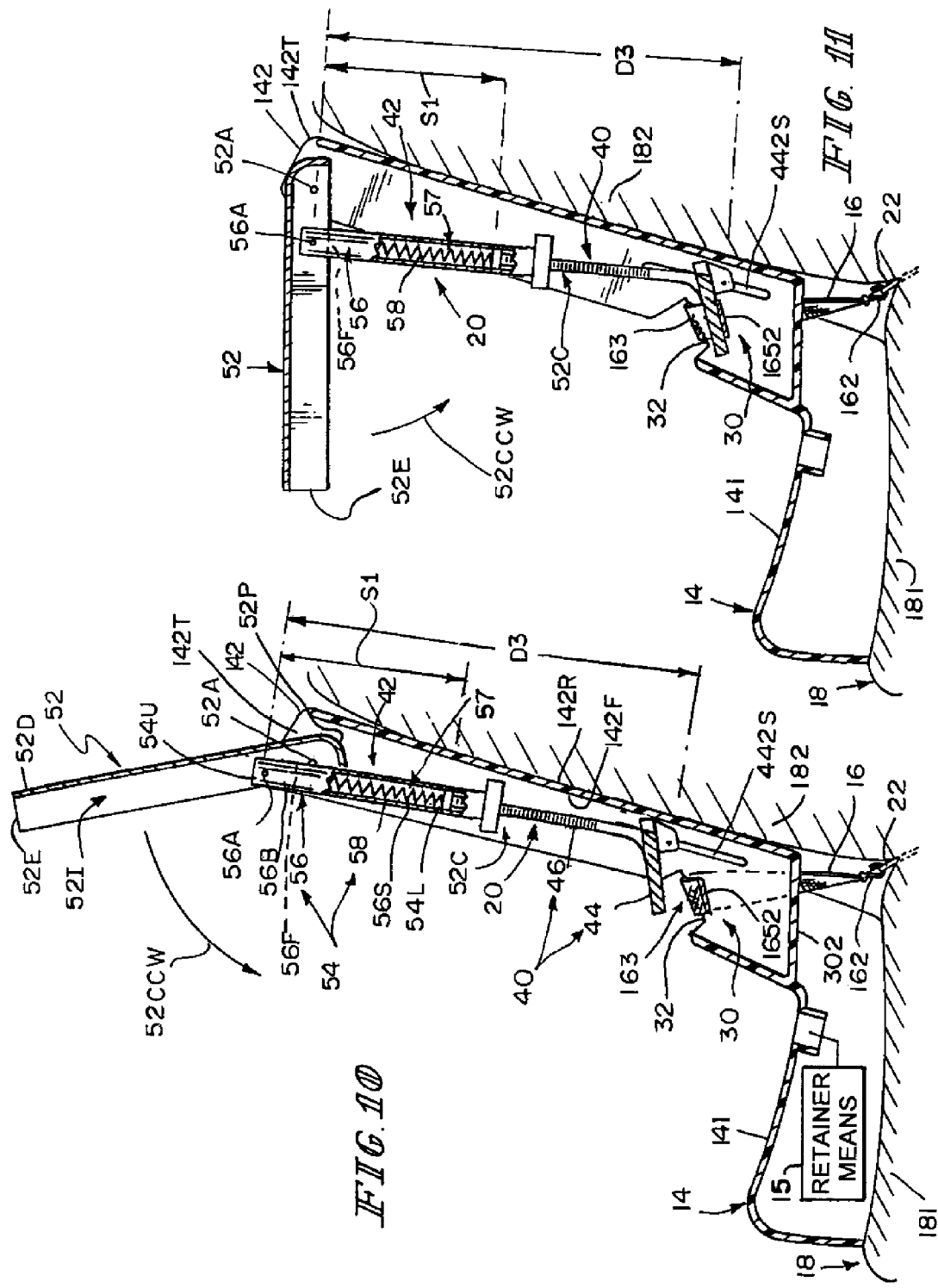

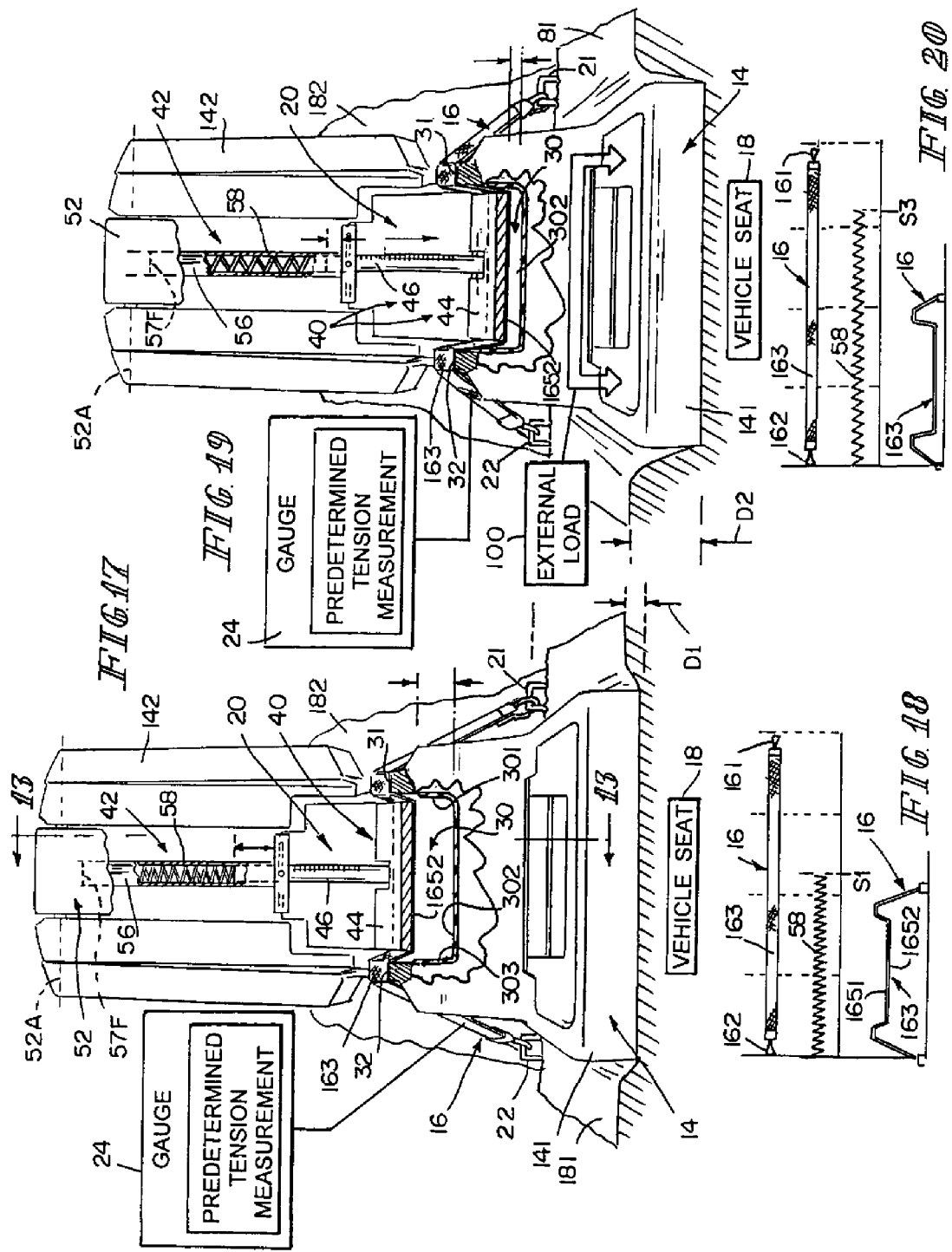

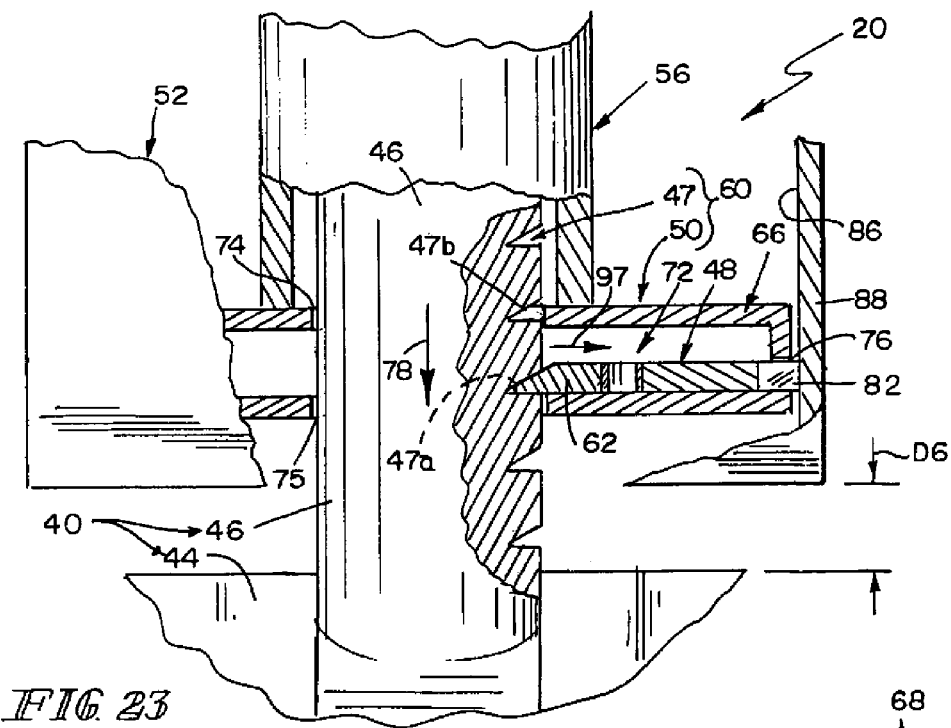
FIG. 23
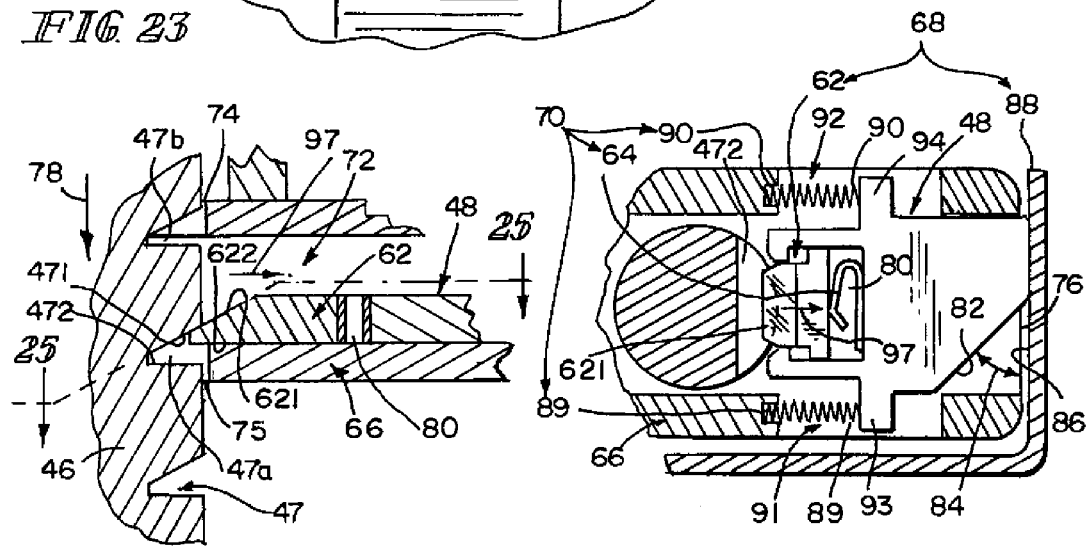
FIG. 24
FIG. 25

CHILD RESTRAINT FOR VEHICLE

PRIORITY CLAIM

This application claims priority under 35 U.S.C. §119(e) to U.S. Provisional Application Ser. No. 61/331,254, filed May 4, 2010, which is expressly incorporated by reference herein.

BACKGROUND

The present disclosure relates to child restraints, and particularly to child restraints for use on passenger seats in vehicles. More particularly, the present disclosure relates to a child restraint including a base held in place on an underlying passenger seat by an anchor belt coupled to the vehicle and a juvenile seat coupled to the base.

SUMMARY

A child restraint in accordance with the present disclosure includes an anchor belt and a juvenile holder configured to hold a young child or an infant. The anchor belt is adapted to be coupled to anchor mounts included in a vehicle to retain the juvenile holder in place on a passenger seat in a vehicle.

In illustrative embodiments, the juvenile holder includes a shell-support base adapted to set on the passenger seat in a vehicle in close proximity to the first and second anchor mounts included in the vehicle. The juvenile holder also includes a juvenile seat shell adapted to be coupled to the shell-support base. The anchor belt includes a first connector adapted to be coupled to the first anchor mount and a second connector adapted to be coupled to the second anchor mount. The anchor belt also includes a strap arranged to extend between the first and second anchor mounts and lie on the shell-support base and extend along an initial belt path between the first and second anchor mounts when the first connector is coupled to the first anchor mount and the second connector is coupled to the second anchor mount to establish a just-installed position of the anchor belt on the shell-support base.

In illustrative embodiments, the child restraint further includes a belt tensioner coupled to a back included in the shell-support base and configured to be used by a caregiver to change the belt path and increase tension in the anchor belt during a first actuation stage that takes place before the juvenile seat shell is coupled to the shell-support base. The belt tensioner is configured to include means for moving the anchor belt relative to the shell-support base from the initial belt path to a first changed belt path to take slack out of the anchor belt before a caregiver couples the juvenile seat shell to the shell-support base and while the anchor belt remains coupled to the first and second anchor mounts to lie in the just-installed position. Removal of such anchor-belt slack acts to increase tension in the anchor belt from an initial installation tension associated with the just-installed position of the anchor belt to a relatively greater predetermined tension so that the shell-support base is tethered to the vehicle in a relatively stationary position on the passenger seat in accordance with a predetermined specification.

In illustrative embodiments, the belt tensioner includes a belt pusher, a pivotable actuator lever mounted on the back of the shell-support base, and an energy-storage spring coupled to the belt pusher and to the actuator lever. In use, a caregiver throws the actuator lever to move the belt pusher against the installed anchor belt to set the anchor belt to the predetermined tension and to store energy in the spring. If any unexpected detensioning of the anchor belt occurs later (e.g., because of climate change in the vehicle, change in cushion characteristics of the passenger seat, movement and/or size of child restrained in the juvenile seat shell, etc.), then energy stored in the spring is released automatically during a subsequent second actuation stage to move the belt pusher further relative to the shell-support base to increase tension in the anchor belt back to the predetermined tension without use of the actuator lever by the caregiver.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 4, 6, 7, and 8 are a series of partial perspective views showing that the L-shaped shell-support base is coupled to the passenger seat using the anchor belt and that the lever-actuated belt tensioner is operated by a caregiver before a juvenile seat shell is mounted on the L-shaped shell-support base to apply a force to the installed anchor belt to change the belt path of the anchor belt relative to the shell-support base and increase tension in the anchor belt to reach a predetermined tension (PT) that is greater than the initial installation tension (IT) so as to retain the child restraint in a substantially stationary position on the underlying passenger seat as shown in FIG. 9;

FIG. 4 is a perspective view of the shell-support base of FIG. 1 in place on the passenger seat of FIG. 1 before use of the belt tensioner to take slack out of the anchor belt that has been arranged to extend along an initial belt path across a middle section of the shell-support base and lie in the just-installed position on the shell-support base and showing that a section of the shell-support base has been removed to show a belt-receiving channel located under a central portion of a strap included in the anchor belt and formed between first and second belt-support pads supporting the anchor belt to cause the central portion of the anchor belt strap to form a bridge spanning the belt-receiving channel while opposite ends of the anchor belt are coupled to the anchor mounts to establish the initial belt path of the anchor belt and retain the anchor belt in the just-installed position on the shell-support base;

FIG. 5 is a partial perspective view of the shell-support base shown in FIG. 4 showing a belt pusher included in the belt tensioner and used to apply a downward force to the central portion of the anchor belt strap and showing that the belt pusher is mounted for up-and-down movement in a central channel defined between two spaced-apart left-side and right-side side walls included in the back of the shell-support base and showing that such up-and-down movement of the belt pusher is guided by sliding motion of outwardly extending pins included in the belt pusher in companion guide slots formed in the left-side and right-side side walls;

FIG. 6 is a perspective view similar to FIG. 4, with portions broken away to reveal that the belt pusher has engaged and moved the central portion of the anchor belt strap to change the belt path of the anchor belt relative to the underlying shell-support base as a result of pivoting movement of an actuation lever also included in the belt tensioner in a counterclockwise direction (solid double arrow) to increase tension in the anchor belt to a level-one tension (that is greater than the initial installation tension) as represented diagrammatically by a belt-tension gauge coupled to the anchor belt;

FIG. 6A is a perspective view of an illustrative belt-tension gauge coupled to an outer portion of the anchor belt strap located between the belt pusher and one of the anchor mounts;

FIG. 7 is a perspective view similar to FIGS. 4 and 6 showing further counterclockwise pivoting movement of the actuation lever to change the belt path of the anchor belt further relative to the underlying shell-support base so as to increase tension in the anchor belt to a relatively greater level-two tension;

FIG. 8 is a perspective view similar to FIGS. 4, 6, and 7 showing that the belt pusher has been moved far enough in a downward direction into the belt-receiving channel formed between the first and second belt-support pads to cause the anchor belt to extend along a first changed belt path to increase tension in the anchor belt to reach a predetermined tension (PT) that is greater than the initial installation tension (IT) so that movement of the shell-support base relative to the underlying passenger seat is limited in accordance with a predetermined specification;

FIG. 9 is a perspective view of a juvenile seat shell mounted in a forward-facing position on the shell-support base of FIG. 8 to form a juvenile holder after the belt tensioner has been used to change the belt path of the anchor belt relative to the shell-support base to increase tension in the anchor belt to a predetermined tension so that movement of the shell-support base and the juvenile seat shell coupled to the underlying shell-support base relative to an underlying passenger seat in a vehicle is limited in accordance with a predetermined specification;

FIG. 9A is a reduced-size side elevation view of the shell-support base of FIG. 8 carrying a juvenile seat shell expressed as an infant carrier;

FIG. 9B is a reduced-size side elevation view of the shell-support base of FIG. 8 carrying a juvenile seat shell in a rear-facing position thereon;

FIG. 10 is an enlarged sectional view taken along line 10-10 of FIG. 4;

FIG. 11 is an enlarged sectional view taken along line 11-11 of FIG. 6;

FIG. 17 is a front perspective view of the child restraint of FIG. 8, with portions broken away to show that the central portion of the anchor belt strap has been pushed into the belt-receiving channel formed in the back of the shell-support base and located between the first and second belt-support pads by the belt pusher to cause the anchor belt now to extend along a first changed belt path to increase tension in the anchor belt to reach the predetermined tension as measured by a belt-tension gauge coupled to an outer portion of the anchor belt strap;

FIG. 18 is a diagrammatic illustration showing (from bottom to top) the shape of the anchor belt when it is caused to extend along the first changed belt path, the effective length of a rod-mover spring included in the belt tensioner when the anchor belt is caused to extend along the first changed belt path, and the length of the anchor belt;

FIG. 19 is a front perspective view similar to FIG. 17 showing that the child restraint (with the juvenile seat shell omitted) has moved relative to the passenger seat in response to, for example, application of an external load to the child restraint, with portions broken away to show that the central portion of the anchor belt strap has been pushed further into the belt-receiving channel by a downward force generated using energy stored in the rod-mover spring and applied to the anchor belt strap by the belt pusher to change the path of the anchor belt so that the anchor belt now extends along a second changed belt path that is different from the first changed belt path so as to restore the anchor belt to the predetermined tension without any movement of the actuator lever relative to the shell-support base;

FIG. 20 is a diagrammatic illustration similar to FIG. 18 showing (from bottom to top) the shape of the anchor belt when it is caused to extend along the second changed belt path, the increased effected length of the rod-mover spring included in the belt tensioner after it has released stored energy to apply a further downward force to the central portion of the anchor belt strap to change the belt path of the anchor belt, and the unchanged length of the anchor belt as compared to the anchor belt depicted in FIGS. 17 and 18;

FIGS. 23-26 show an illustrative sequence of operation of the tension-locking unit of FIG. 16 during downward movement of the belt pusher in response application of an external load to the child restraint as shown in FIG. 19.

DETAILED DESCRIPTION

Figure 1:
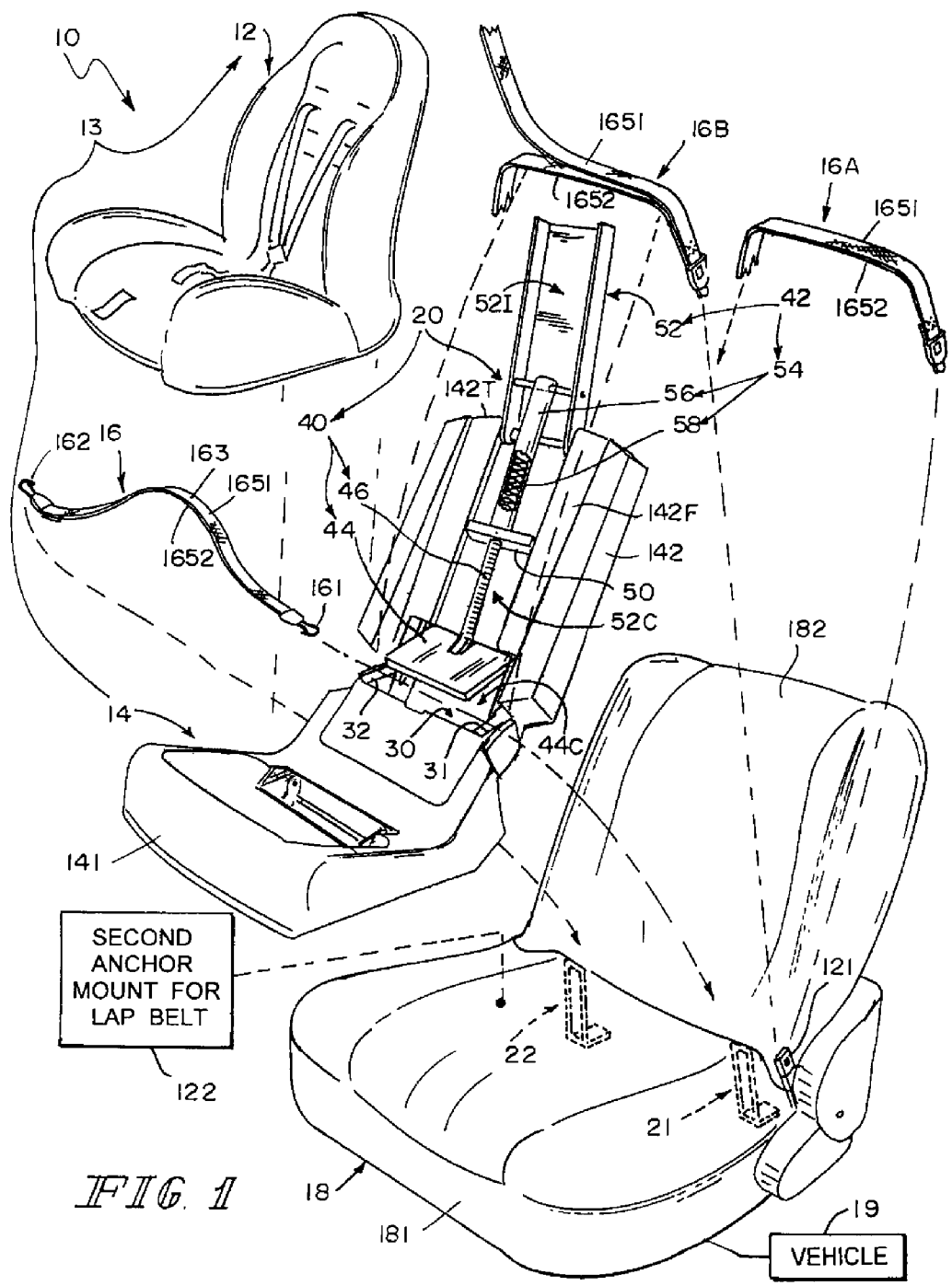
FIG. 1 is an exploded perspective assembly view of a child restraint in accordance with the present disclosure adapted to be anchored in place on a passenger seat in a vehicle to anchor mounts associated with the passenger seat and showing that the child restraint comprises a juvenile holder including a juvenile seat shell and an L-shaped shell-support base located under the juvenile seat shell and configured to rest on the underlying passenger seat, three alternative anchor belts [e.g., either a LATCH belt (on the left), a lap belt (on the right), or a lap-and-shoulder belt harness (on the top)] for mating with the anchor mounts to hold the shell-support base in place on the passenger seat, and a lever-actuated belt tensioner mounted on an upper portion of the shell-support base and used by an installer to take the slack out of the anchor belt after it has been laid across the shell-support base and coupled at each end to one of the anchor mounts associated with the passenger seat to extend along an initial belt path as shown, for example, in FIGS. 2-5 so that tension in the anchor belt can be increased by moving the actuator lever included in the belt tensioner as suggested in FIGS. 6-8 to reach a predetermined tension as suggested in FIG. 8.

A child restraint 10 includes a juvenile seat shell 12, a shell-support base 14, and an anchor belt 16 as suggested in FIGS. 1 and 9. Shell-support base 14 is adapted to set on an underlying passenger seat 18 in a vehicle 19 and is held in place in an initial installation position on passenger seat 18 using anchor belt 16 as suggested in FIGS. 2-4 and 10. In this just-installed position, anchor belt 16 is coupled by a caregiver to first and second anchor mounts 21, 22 arranged to lie on shell-support base 14 so as to exhibit an initial installation tension (IT) when exposed to a belt-tension gauge 24 as suggested in FIG. 4. Child restraint 10 is configured in accordance with the present disclosure to allow a caregiver to move the installed anchor belt 16 relative to shell-support base 14 from the just-installed position to another position to increase tension in anchor belt 16 to reach a relatively greater predetermined tension (PT) as suggested in FIGS. 4-8 before juvenile seat shell 12 is coupled by the caregiver to shell-support base 14.

Child restraint 10 also includes a belt tensioner 20 mounted for movement on shell-support base 14. Belt tensioner 20 is used by a caregiver (not shown) during a first actuation stage before juvenile seat shell 12 is coupled to shell-support base 14 to cause a belt pusher 40 included in belt tensioner 20 to move a portion of anchor belt 16 relative to shell-support base 14 while anchor belt 16 is coupled to anchor mounts 21, 22 to take slack out of anchor belt 16 as suggested in FIGS. 6-8 so as to increase tension in anchor belt 16 from the initial installation tension (IT) to a relatively greater predetermined tension (PT). This increase in belt tension causes shell-support base 14 to be tethered to vehicle 19 in a relatively stationary position on passenger seat 18 as suggested in FIGS. 8 and 13. Then juvenile seat shell 12 can be coupled to shell-support base 14 by the caregiver in one of several different ways as suggested in FIGS. 9, 9A, and 9B after anchor belt 16 has been stretched to reach the predetermined tension (PT).

A second actuation stage can take place automatically without any action on the part of a caregiver while juvenile seat shell 12 is mounted on shell-support base 14 in the event that any unexpected detensioning of anchor belt 16 occurs later as suggested in FIGS. 17-20. As disclosed herein, energy is stored in a spring 58 included in belt tensioner 20 during the first actuation stage owing, e.g., to compression of spring 58 during use of belt pusher 40 to increase tension in anchor belt 16 as shown in FIGS. 10-13. Energy stored in spring 58 is released automatically during a subsequent second actuation stage after juvenile seat shell 12 has been mounted on shell-support base 14 to move belt pusher 40 included in belt tensioner 20 further relative to shell-support base 14 to increase tension in anchor belt 16 back to the predetermined tension (PT) as suggested in FIGS. 19 and 20.

Juvenile seat shell 12 (or any suitable juvenile seat) may be coupled to shell-support base 14 using any suitable means to provide a juvenile holder 13 as suggested in FIGS. 1 and 9 after belt tensioner 20 is used by a caregiver during the first actuation stage to tension anchor belt 16 to the predetermined tension (PT). It is within the scope of this disclosure to orient juvenile seat shell 12 to lie in a forward-facing direction on shell-support base 14 as suggested in FIGS. 1 and 9. Juvenile seat shell 12 alternatively can be oriented to lie in a rearwardly facing direction on shell-support base 14 as suggested in FIG. 9B. Alternatively, an infant carrier 12 can be coupled to shell-support base 14 as suggested in FIG. 9A.

Shell-support base 14 includes a foundation 141 and a back 142 arranged to extend upwardly from foundation 141 as shown, for example, in FIG. 1. Foundation 141 is adapted to set on a bench 181 included in passenger seat 18 while back 142 is adapted to contact a backrest 182 included in passenger seat 18 as suggested in FIGS. 1 and 9. In illustrative embodiments, belt tensioner 20 is coupled to back 142 of shell-support base 14 as suggested in FIG. 1.

Belt tensioner 20 is used in accordance with the present disclosure during a first actuation stage to increase tension in anchor belt 16 to a predetermined tension (PT) from a relatively lower initial installation tension (IT) that was reached following initial installation of anchor belt 16 on shell-support base 14 to mate with first and second anchor mounts 21, 22. Anchor belt 16 is a LATCH belt in the illustrated embodiment and is configured to mate with LATCH anchor mounts 21, 22 in a LATCH system in a conventional way as suggested in FIGS. 1-3. LATCH stands for Lower Anchors and Tethers for Children. LATCH is a system in the Untied States that standardizes the installation of child restraints in vehicles without using the lap or shoulder belts provided in the vehicle.

Belt tensioner 20 can also be used in accordance with the present disclosure to tension an anchor belt other than LATCH anchor belt 16 as suggested in FIG. 1. Belt tensioner 20 can tension a vehicle lap belt 16A that is arranged to lie on shell-support base 14 and is coupled to first and second (lap belt) anchor mounts 121, 122 included in vehicle 19 and associated with passenger seat 18 as suggested in FIG. 1. Belt tensioner 20 can also tension a vehicle lap-and-shoulder belt harness 16B that is arranged to lie on shell-support base 14 and is coupled to first and second (lap belt) anchor mounts 121, 122 as suggested in FIG. 1.

Figure 8:
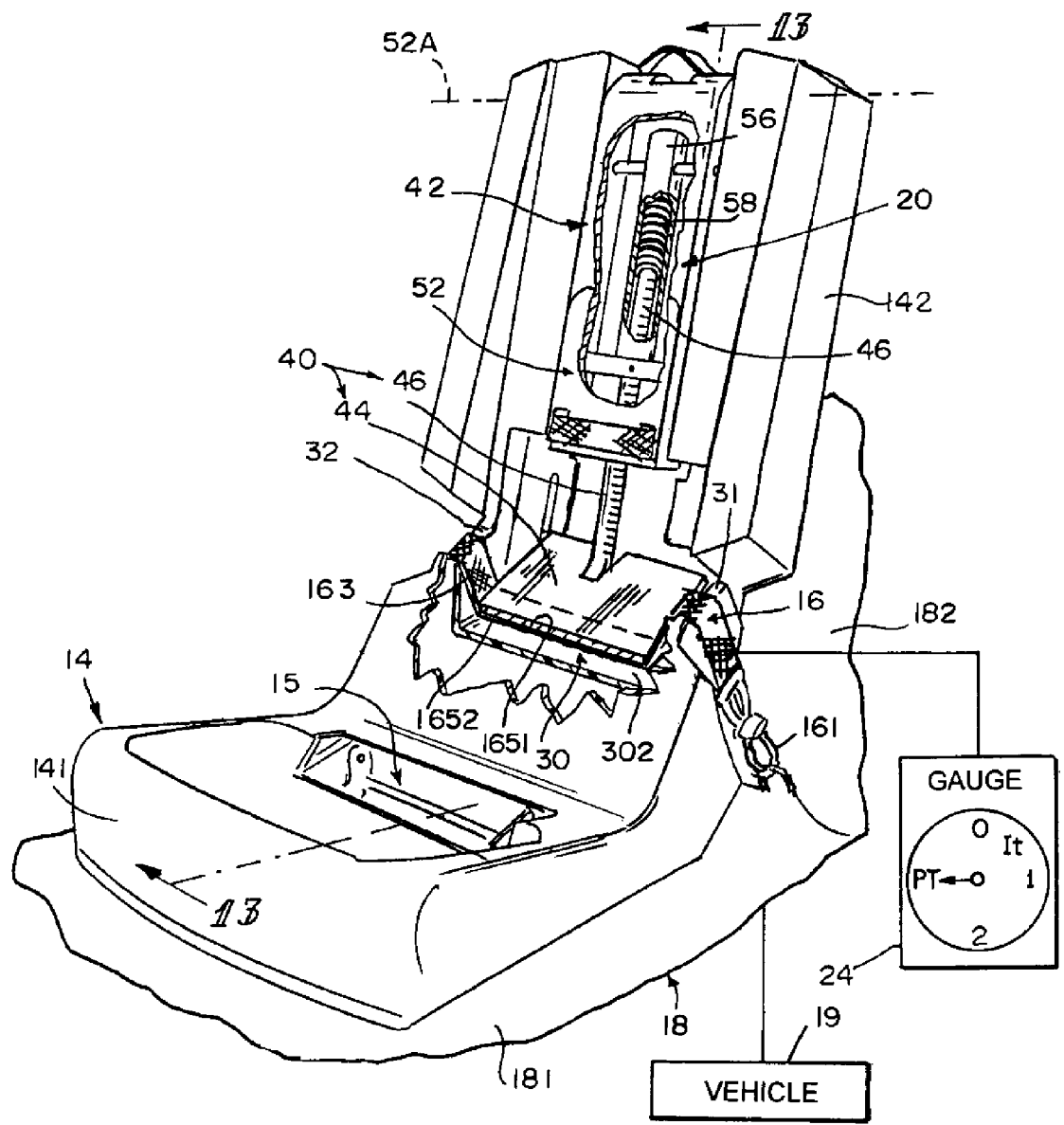
Figure 13:
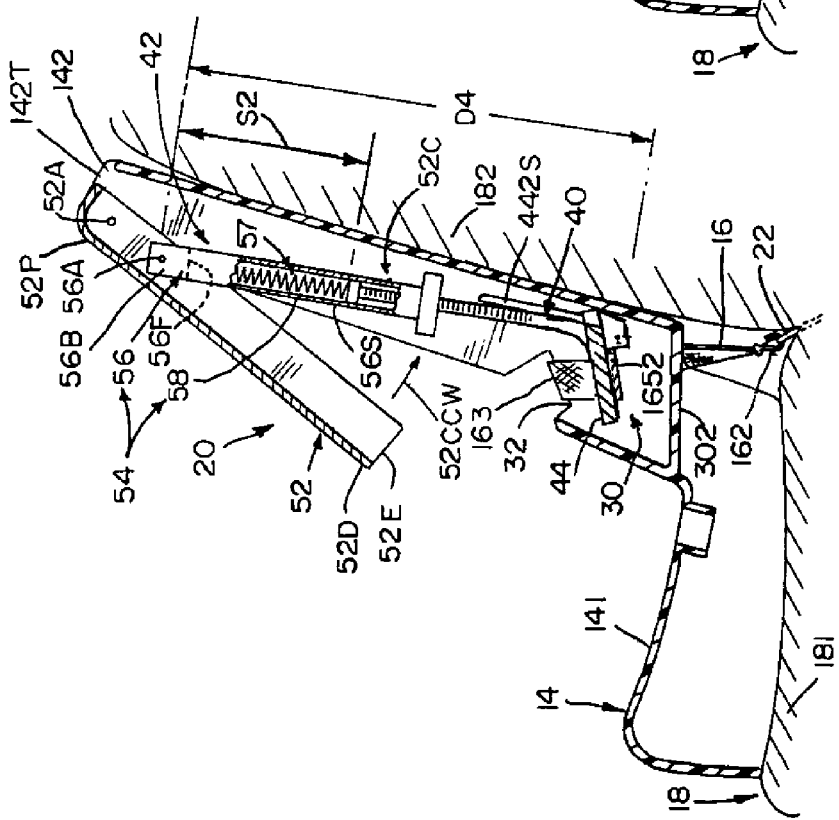
FIG. 13 is an enlarged sectional view taken along line 13-13 of FIG. 8.

Belt tensioner 20 is configured to include means 40, 42 for moving the anchor belt 16 relative to shell-support base 14 before juvenile seat shell 12 is coupled to shell-support base 14 and while anchor belt 16 is coupled to first and second anchor mounts 21, 22 and a portion of the anchor belt 16 remains in contact with a portion of shell-support base 14 from the initial belt path shown in FIGS. 4 and 10 to a first changed belt path shown, for example, in FIGS. 8, 9, and 13. Such movement of anchor belt 16 takes slack out of anchor belt 16 so as to increase tension in anchor belt 16 from an initial installation tension (IT) associated with the just-installed position of anchor belt 16 to a relatively greater predetermined tension (PT) as suggested in FIG. 8 so that movement of shell-support base 14 and juvenile seat shell 12 later coupled to shell-support base 14 to form a juvenile holder 13 relative to an underlying passenger seat 18 in a vehicle 19 is limited in accordance with a predetermined specification as suggested in FIG. 9.

Shell-support base 14 is formed to include spaced-apart first and second belt-support pads 31, 32 and a belt-receiving channel 30 located between belt-support pads 31, 32 as shown, for example, in FIGS. 1 and 4-6. Belt-support pads 31, 32 are located on opposite sides of foundation 141 and arranged to face upwardly to support anchor belt 16 in the just-installed position on shell-support base 14 after anchor belt 16 is arranged to extend across a middle section of shell-support base 14 and is coupled to first and second anchor mounts 21, 22 as suggested in FIGS. 2 and 3. As suggested in FIGS. 4 and 17, belt-receiving channel 30 is bounded by a right wall 301 appended to an inner edge of first belt-support pad 31, a left wall 303 appended to an inner edge of second belt-support pad 32, and a floor 302 extending laterally between lower edges of right and left walls 301, 302.

Belt tensioner 20 includes a belt pusher 40 that is arranged to lie between first and second belt-support pads 31, 32 and above belt-receiving channel 30 as suggested in FIGS. 1, 4, 17, and 18. Belt tensioner 20 also includes a pusher-moving system 42 for moving belt pusher 40 relative to shell-support base 14 first to engage a first surface 16S1 of anchor belt 16 while anchor belt 16 is retained in the just-installed position lying on first and second belt-support pads 31, 32 and then to move a portion of anchor belt 16 in belt-receiving channel 30 toward channel floor 302 to increase tension in anchor belt 16 until the predetermined tension (PT) is reached. In illustrative embodiments, an opposite second surface 16S2 of anchor belt 16 is arranged to lie in spaced-apart relation to channel floor 302 when the predetermined tension (PT) is reached as suggested in FIGS. 8, 9, 13, and 17 so as to maximize the slack that can be taken out of anchor belt 16 by belt tensionier 20. Then juvenile seat shell 12 can be mounted by the caregiver on foundation 141 of shell-support base 14 as shown, for example, in FIG. 9, 9A, or 9B.

Belt pusher 40 includes a push plate 44 arranged to lie above anchor belt 16 and a push rod 46 arranged to extend upwardly from push plate 44 as shown, for example, in FIGS. 4 and 5. Push rod 46 is coupled to pusher-moving system 42 as suggested in FIGS. 1, 4, and 10.

Push plate 44 is arranged normally to overlie a central portion of a strap 163 included in anchor belt 16 when anchor belt 16 is retained in the just-installed position on shell-support base 14 as suggested in FIGS. 1 and 4. In an illustrative embodiment, anchor belt 16 includes a first connector 161 configured to mate with first anchor mount 21, a second connector 162 configured to mate with second anchor mount 22, and a strap 163 arranged to interconnect first and second connectors 161, 162 and lie on first and second belt-support pads 31, 32 when anchor belt 16 is retained in the just-installed position as shown, for example, in FIGS. 1-5. First and second belt-support pads 31, 32 are arranged to support anchor belt 16 to cause the central portion of anchor belt strap 163 to form a bridge spanning belt-receiving channel 30 while connectors 161, 162 are coupled to anchor mounts 21, 22 to establish an initial belt path of anchor belt 16 extending across a middle section of shell-support base 14 as suggested in FIGS. 4 and 5.

Figure 14:
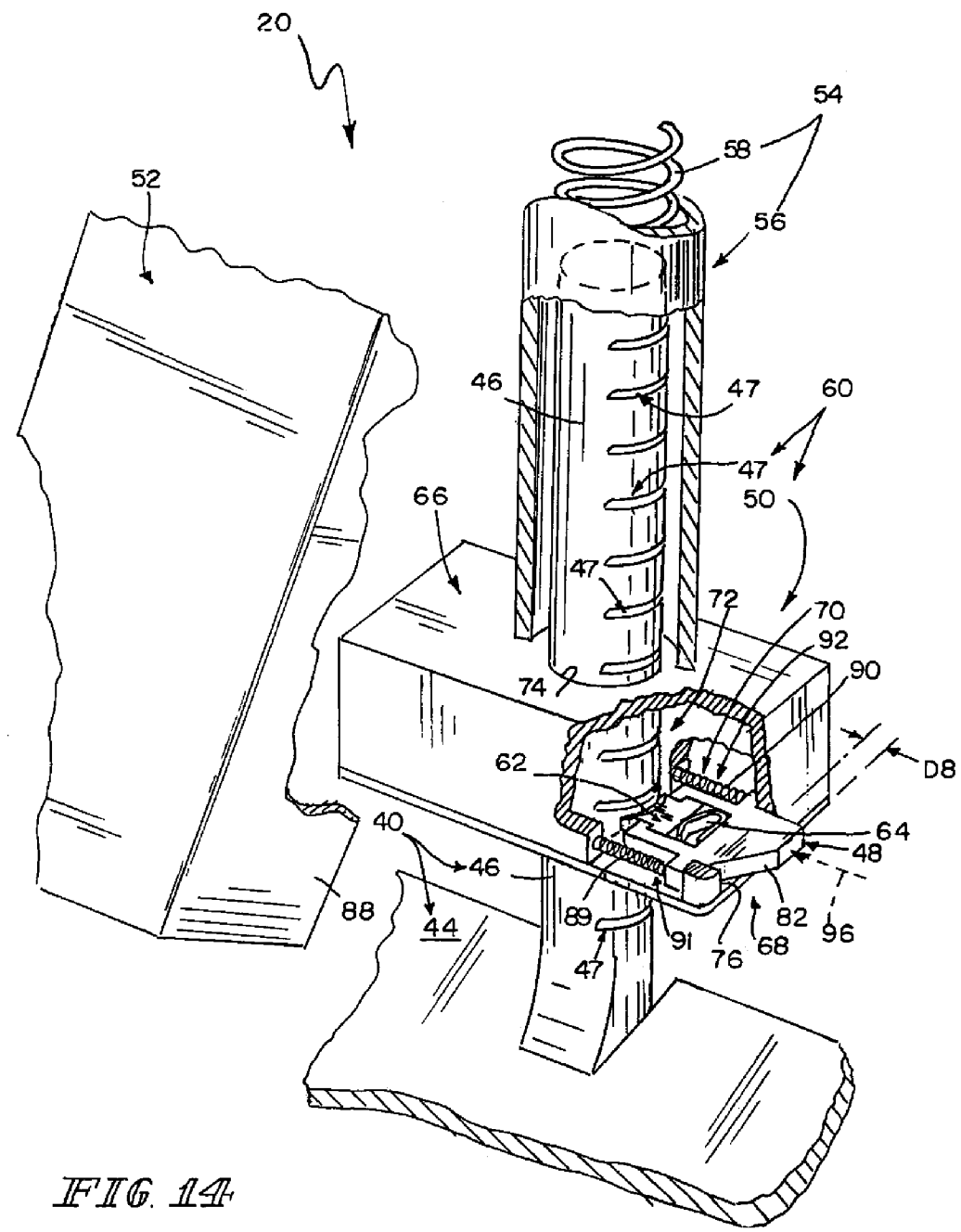
FIG. 14 is an enlarged perspective view of a portion of the belt tensioner shown in the circled area of FIG. 7, with portions broken away, and showing a portion of the actuator lever (on the left) and that the belt pusher includes a horizontally extending push plate and an upwardly extending notched push rod coupled to the push plate and showing that the belt tensioner also includes a tension-locking unit arranged to receive a portion of the push rod therein and move relative to the push rod as suggested in FIGS. 10-13 and configured to yieldably engage notches formed in the push rod to provide means for retaining the belt pusher in a lowered position to locate the push plate in a desired location in the belt-receiving channel to apply a downward force to the central portion of the anchor belt strap to maintain tension in the anchor belt at the predetermined tension.

Push rod 46 includes a lower end coupled to push plate 44 and an upper end coupled to pusher-moving system 42 as suggested in FIGS. 1 and 14. In an illustrative embodiment, a series of notches 47 are formed in push rod 46 as suggested in FIGS. 1 and 14. These notches 47 are sized and located to receive a movable lock plate 48 included in a tension-locking unit 50 also included in belt tensioner 20 and configured to retain belt pusher 40 in desired positions relative to shell-support base 14 after anchor belt 16 has been tensioned to reach the predetermined tension (PT).

Pusher-moving system 42 includes an actuator 52 and a force-transfer device 54 coupled to actuator 52 and to belt pusher 40 as suggested in FIG. 1. Actuator 52 is mounted on shell-support base 14 to be moved by a caregiver relative to shell-support base 14 during the first actuation stage from an inactive position to an active position before juvenile seat shell 12 is coupled to shell-support base 14. Force-transfer device 54 is coupled to belt pusher 40 and to actuator 52 and is configured to apply a downward force to belt pusher 40 to cause belt pusher 40 to push downwardly on first surface 16S1 of the central portion of anchor belt strap 163 in response to movement of actuator 52 relative to shell-support base 14 from the inactive position shown, for example, in FIGS. 4 and 10 to the active position shown, for example, in FIGS. 8 and 13.

Actuator 52 is a lever mounted on back 142 of shell-support base 14 for pivotable movement about an actuator pivot axis 52A in an illustrative embodiment as suggested in FIG. 4. In an inactive position, actuator lever 52 is arranged, for example, to extend upwardly away from foundation 141 as suggested in FIGS. 1-4 and 10. The caregiver can pivot actuator lever 52 about actuator pivot axis 52A in a counter-clockwise direction 52CCW to reach an active position shown, for example, in FIGS. 8 and 13 in which anchor belt 16 has been tensioned to the predetermined tension (PT). In the action position, actuator lever 52 is deposited into a lever-receiving channel 52C formed in back 142 of shell-support base 14 so as not to interfere with the subsequent mounting of juvenile seat shell 12 on foundation 140 of shell-support base 14.

In an illustrative embodiment, force-transfer device 54 includes a spring mount 56 coupled to actuator lever 52 and a spring 58 coupled to and interposed between belt pusher 40 and spring mount 56. Spring mount 56 is a tubular sleeve formed to include an interior region 57 containing spring 58 as suggested in FIGS. 4 and 10. An upper portion of push rod 46 is arranged to extend into interior region 57 to contact a lower end of spring 58 through an opening formed in a lower end of the tubular sleeve defining spring mount 56 as suggested in FIGS. 10-13. Also, tension-locking unit 50 is coupled to a lower end of spring mount 56 to move therewith as suggested in FIGS. 10-13.

Spring mount 56 is mounted on actuator lever 52 for pivotable movement about a mount pivot axis 56A as suggested, for example, in FIGS. 10-13. Mount pivot axis 56A is arranged to lie between actuator pivot axis 52A and a free end 52E of actuator lever 52 in an illustrative embodiment shown in FIGS. 10-13.

Force-transfer device 54 includes an upper end 54U coupled to actuator lever 52 at the mount pivot axis 54 and an opposite lower end 54L as suggested in FIGS. 4 and 10. Belt pusher 40 includes a push plate 44 arranged to engage the central portion of anchor belt strap 163 and a push rod 46 arranged to extend upwardly from push plate 44 to engage lower end 54L of force-transfer device 54 as also suggested in FIGS. 4 and 10.

Shell-support base 14 is formed to include a pin-receiving slot 442S defining a motion guide for belt pusher 40 as suggested in FIG. 5. Belt-pusher 40 further includes an outwardly extending pin 442 coupled to push plate 44 and arranged to extend into pin-receiving slot 442S as suggested in FIG. 5 and move up and down therein to guide movement of belt pusher 40 relative to shell-support base 14 during pivoting movement of actuator lever 52 about actuator pivot axis 52A between the inactive and active positions as suggested in FIGS. 10-13.

Figures 6, 6A:
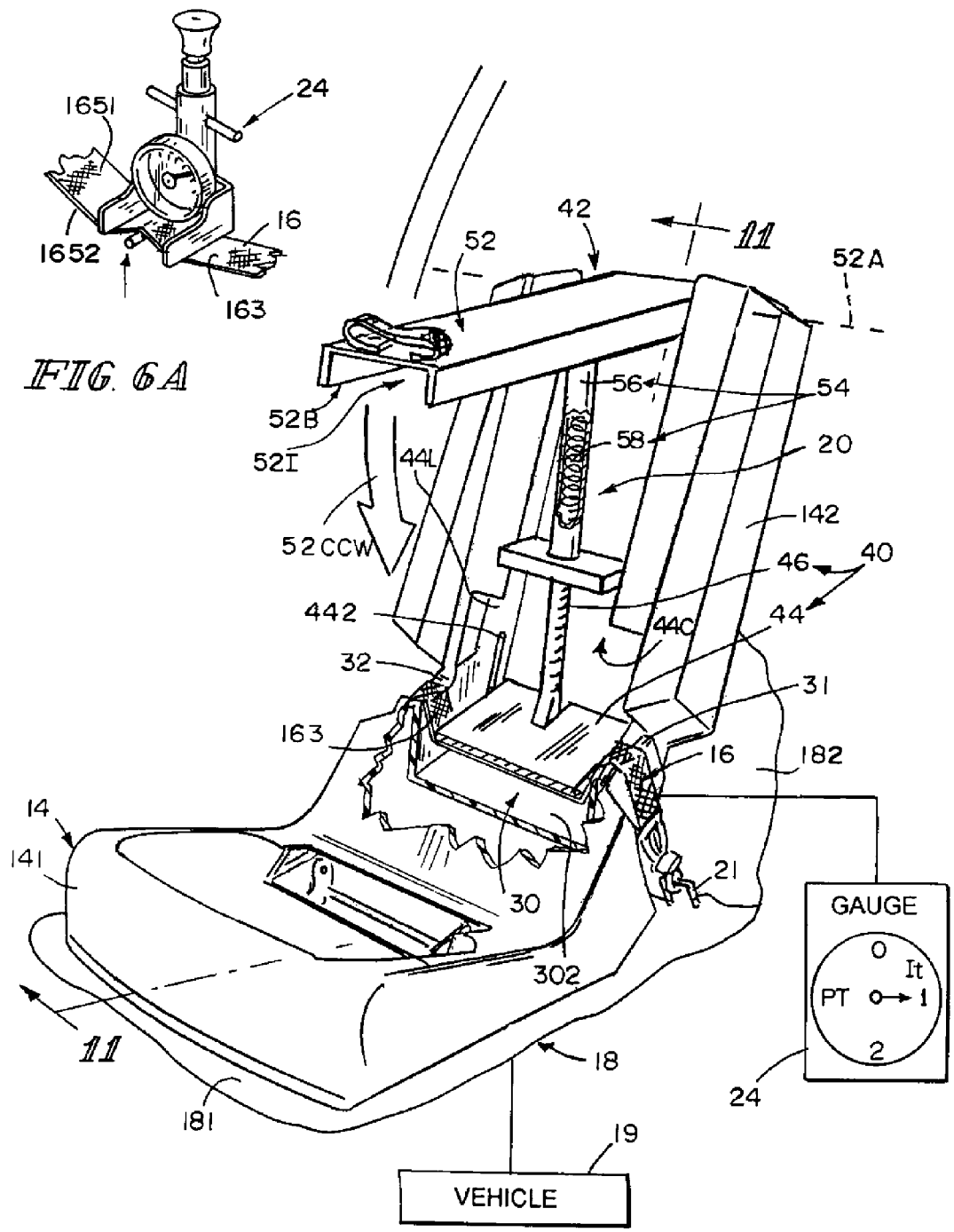

Belt pusher 40 is mounted for up-and-down movement in a central channel 44C formed in shell-support base 14 and defined between spaced-apart left-side and right-side side walls 44L, 44R included in shell-support base 14 as suggested in FIGS. 5 and 6. In an illustrative embodiment, up-and-down movement of push plate 44 is guided by sliding motion of first and second outwardly extending pins 441, 442 included in belt pusher 40 and coupled to push plate 44 in companion guide slots 441S, 442S formed in right-side and left-side side walls 44R, 44L as suggested in FIGS. 5 and 6.

Actuator lever 52 is formed to include an interior region 52I as suggested in FIGS. 4, 6, and 10. Force-transfer device 54 is arranged to lie in interior region 52I of actuator lever 52 upon movement of actuator lever 52 to the active position as suggested in FIG. 13.

Actuator lever 52 is formed to include a bottom aperture 52B opening into interior region 52I formed in actuator lever 52 as suggested in FIGS. 4 and 6. Bottom aperture 52B faces toward back 182 of shell-support base 14 upon movement of actuator lever 52 to the active position as suggested in FIGS. 8 and 13. This allows force-transfer device 54 to pass into interior region 52I formed in actuator lever 52 through bottom aperture 52B during pivoting movement of actuator lever 52 about actuator pivot axis 52A from the inactive position to the active position as suggested in FIGS. 10-13.

A portion of push rod 46 is arranged to extend into interior region 52I formed in actuator lever 52 upon movement of actuator lever 52 to the active position as suggested in FIGS. 10-13. Push rod 46 is arranged to extend along a reference line intersecting each of actuator and mount pivot axes 52A, 56A upon movement of actuator lever 52 to assume the active position as suggested in FIG. 13.

Back 142 of shell-support base 14 is arranged to extend upwardly from foundation 141 and terminate along a top edge 142T arranged to lie in spaced-apart relation to foundation 141 and actuator pivot axis 52A is located in close proximity to top edge 142T of back 142 of shell-support base 14 as suggested in FIGS. 4 and 10. Back 142 is formed to include a forwardly opening channel 52C extending from about top edge 142T downwardly toward foundation 141 as suggested in FIGS. 4 and 10. Actuator lever 52 is sized and shaped to lie in forwardly opening channel 52C to locate force-transfer device 54 in forwardly opening channel 52C in a space provided between actuator lever 52 and back 142 of shell-support base 14 upon movement of actuator lever 52 to the active position as suggested in FIGS. 8 and 13.

Actuator lever 52 includes a proximal portion 52P coupled to back 142 of shell-support base 14 along the actuator pivot axis 52A and an opposite distal portion 52D as suggested in FIG. 10. Force-transfer device 54 is arranged to lie in a space provided between actuator pivot axis 52A and distal portion 52D of actuator lever 52 upon movement of actuator lever 52 to the active position as suggested in FIG. 13.

Actuator lever 52 is arranged to lie in channel 52C formed in back 142 of shell-support base 14 in response to movement of actuator lever 52 to the active position. Back 142 is formed to include a pair of side walls 52A, 52B arranged to lie in spaced-apart relation to one another and a floor 52F as suggested in FIG. 4. Floor 52F is arranged to extend between side walls 52A, 52B and cooperate with side walls 52A, 52B to form boundaries of channel 52C. Force-transfer device 54 is arranged to lie in channel 52C formed in back 142 in a position between actuator lever 52 and floor 52F in response to movement of actuator lever 46 to the active position as suggested in FIGS. 8 and 13. A portion of push rod 46 is arranged to extend into channel 52C and lie in channel 52C during pivoting movement of actuator lever 52 from the inactive position to the active position as suggested in FIGS. 10-13.

Back 142 has a rear face 142R adapted to face toward a backrest 182 included in passenger seat 18 and arranged to extend upwardly from bench 181 as suggested in FIG. 10. Back 142 also includes a front face 142F arranged to face toward juvenile seat shell 12 when juvenile seat shell 12 is coupled to shell-support base 14 as suggested in FIGS. 1 and 9.

Belt tensioner 20 is coupled to the front face of back 142 of shell-support base 14. Actuator lever 52 is mounted on back 142 for pivotable movement about actuator pivot axis 52A. Belt pusher 40 is arranged to lie between foundation 141 and actuator pivot axis 52A and above anchor belt strap 163. Force-transfer device 54 is arranged to interconnect belt pusher 40 and actuator lever 52 and extend in an upward direction away from foundation 141 toward actuator lever 52.

In use, shell-support base 14 is held in place on passenger seat 18 by anchor belt 16 as shown in FIGS. 4 and 10 before a caregiver has taken out any slack in anchor belt 16 using belt tensioner 20. Anchor belt 16 is coupled to and arranged to extend between anchor mounts 21, 22 and along an initial belt path across a middle section of shell-support base 14 and lie in a just-installed position on shell-support base 14. Belt-tension gauge 24 can be used to record an initial installation tension measurement of anchor belt 16 while it lies in the just-installed position on shell-support base 14 as suggested diagrammatically in FIG. 4.

Lever-actuated belt tensioner 20 is operated by a caregiver to apply a force to the installed anchor belt 16 to change the belt path of anchor belt 16 relative to shell-support base 14 and increase tension in anchor belt 16 to reach a predetermined tension (PT) before juvenile seat shell 12 is mounted on foundation 141 of seat-support shell 14 as suggested in FIGS. 4 and 6-8. This predetermined tension (PT) is greater than the initial installation tension (IT) so as to retain child restraint 10 in a substantially stationary position on the underlying passenger seat 18 as shown in FIG. 9.

Shell-support base 14 is held in place on passenger seat 18 before use of the belt tensioner 20 to take slack out of anchor belt 16 as suggested in FIGS. 4 and 10. A section 14S of shell-support base 14 has been removed to show a belt-receiving channel 30 located under a central portion of anchor belt strap 163 and formed between first and second belt-support pads 31, 32 supporting anchor belt 16 as suggested in FIG. 4. The central portion of anchor belt strap 163 forms a bridge spanning belt-receiving channel 30 while opposite ends of anchor belt 16 are coupled to anchor mounts 21, 22 to establish the initial belt path of anchor belt 16 and retain anchor belt 16 in the just-installed position on shell-support base 14. In this initial installation position of shell-support base 14 on passenger seat 18 of vehicle 19, spring 58 has an effective length S1 and a belt driver comprising belt pusher 40 and spring 58 has an effective length of D3 as suggested in FIG. 10.

Belt pusher 40 is used to apply a downward force to first surface 16S1 of the central portion of anchor belt strap 163 as suggested in FIG. 5. Belt pusher 40 is mounted for up-and-down movement in a central channel 44C defined between two spaced-apart left-side and right-side side walls 44L, 44R included in shell-support base 14. Up-and-down movement of a push plate 44 included in belt pusher 40 is guided by sliding motion of outwardly extending pins 441, 442 included in belt pusher 40 and coupled to push plate 44 in companion guide slots 441S, 442S formed in left-side and right-side side walls 44L, 44R.

As suggested in FIGS. 6 and 11, push plate 44 has engaged and moved the central portion of the anchor belt strap 163 to change the belt path of anchor belt 16 relative to underlying shell-support base 14 as a result of pivoting movement of actuator lever 52 in counterclockwise direction 52CCW. By changing the belt path, tension in anchor belt 16 is increased to a level-one tension [that is greater than the initial installation tension (IT)] as represented diagrammatically by a belt-tension gauge 24 coupled to anchor belt 16 as suggested in FIG. 6.

Figure 7:
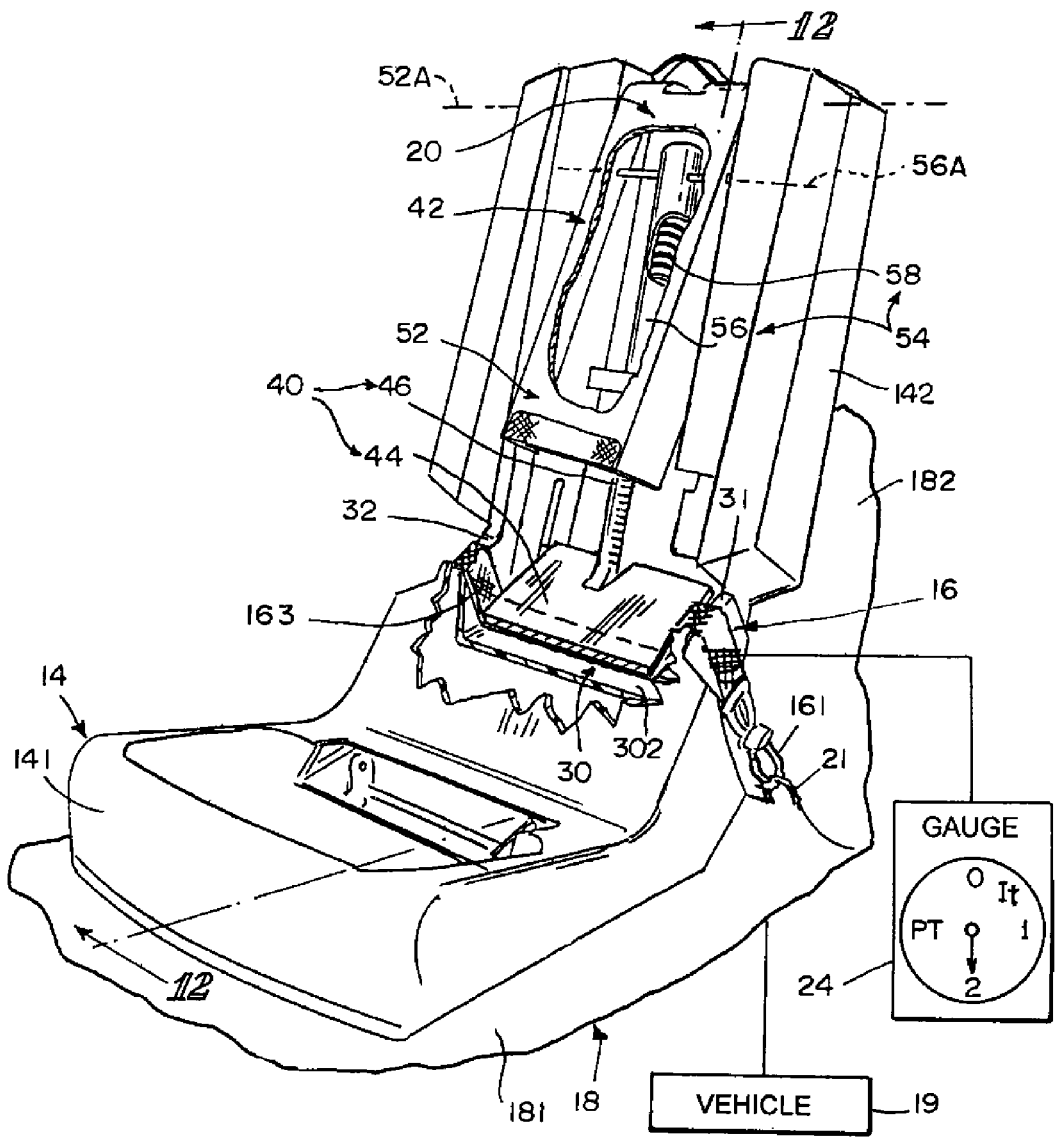
Figure 12:
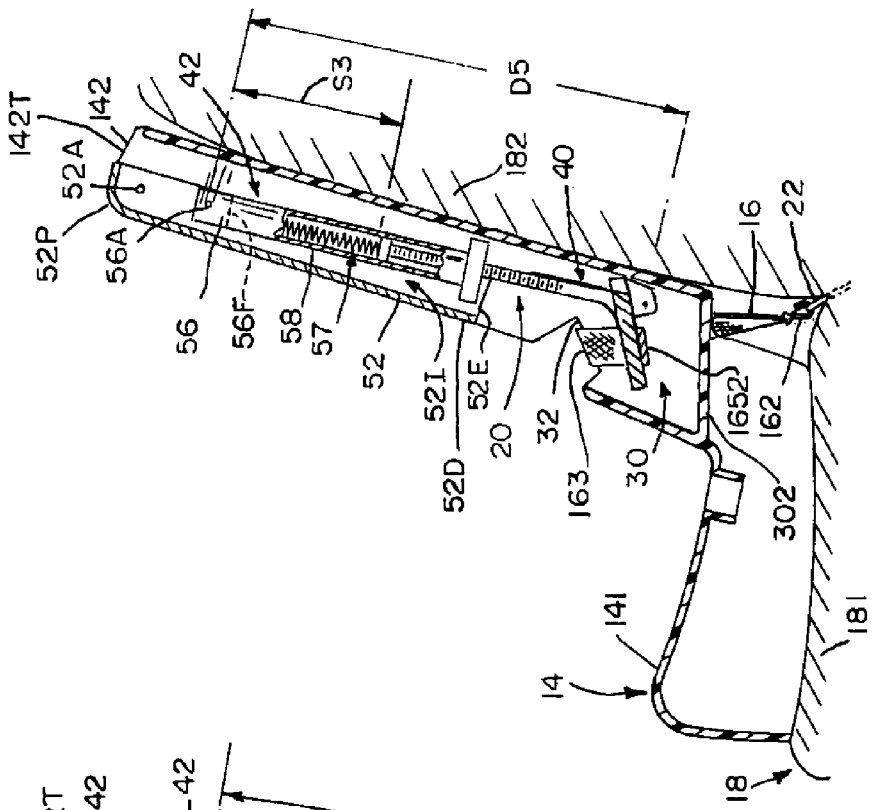
FIG. 12 is an enlarged sectional view taken along line 12-12 of FIG. 7.

Further counterclockwise pivoting movement of actuator lever 52 to change the belt path of anchor belt 16 further relative to underlying shell-support base 14 is shown, for example, in FIGS. 7 and 12. Tension in anchor belt 16 is now increased to a relatively greater level-two tension as suggested in FIG. 7.

As suggested in FIGS. 8 and 13, push plate 44 has been moved far enough in a downward direction into belt-receiving channel 30 formed between first and second belt-support pads 31, 32 to cause anchor belt 16 to extend along a first changed belt path to increase tension in anchor belt 16 to reach a predetermined tension (PT) that is greater than the initial installation tension (IT) without, in an illustrative example, causing second surface 16S2 of anchor belt 16 to contact underlying channel floor 302 associated with belt-receiving channel 30 so that movement of shell-support base 14 relative to underlying passenger seat 18 is limited in accordance with a predetermined specification. Then juvenile seat shell 12 is mounted, for example, in a forward-facing position on shell-support base 14 as suggested in FIG. 9. In an illustrative embodiment, foundation 141 of shell-support base 14 includes retainer means 15 (see FIGS. 8 and 10) for mating with juvenile seat shell 12 to retain juvenile seat shell 12 in a stationary position on foundation 141 to form juvenile holder 13 as suggested in FIG. 9.

Figures 2, 3:
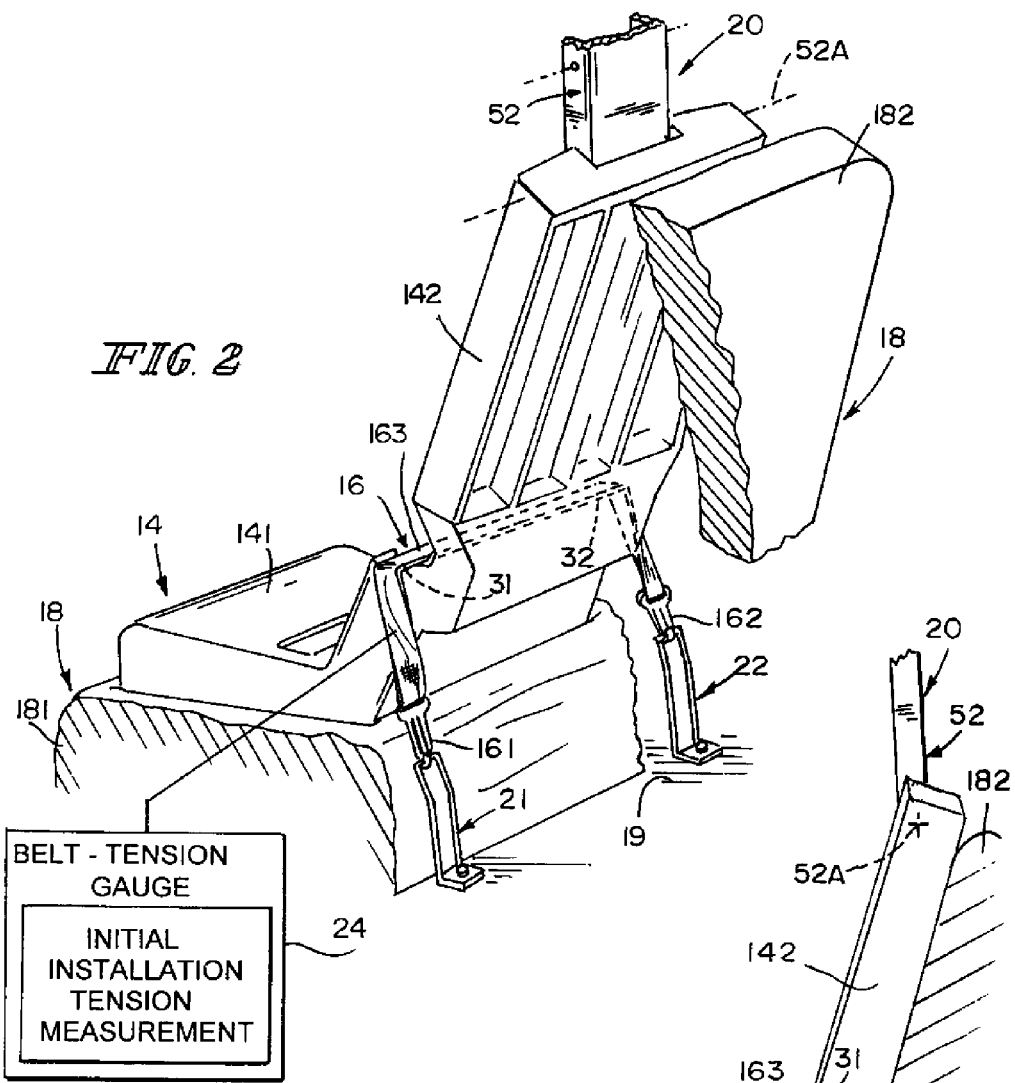
FIG. 2 is a rear perspective view of the passenger seat of FIG. 1, with portions broken away to reveal that the L-shaped shell-support base is held in place on the passenger seat by an anchor belt coupled to and arranged to extend between two anchor mounts and along an initial belt path across a middle section of the shell-support base and lie in a just-installed position on the shell-support base and showing diagrammatically that a belt-tensioning gauge can be used to record an initial installation tension measurement of the anchor belt while it lies in the just-installed position on the shell-support base.
FIG. 3 is a side elevation view of the L-shaped shell-support base and anchor belt of FIG. 2.

As suggested in FIG. 17, the central portion of anchor belt strap 163 has been pushed into belt-receiving channel 130 formed in shell-support base 14 by push plate 44 to cause anchor belt 16 now to extend across a middle section of shell-support base 14 along a first changed belt path that is different from the initial belt path shown, for example, in FIGS. 2-4. Tension in anchor belt 16 is increased by changing the belt path to reach the predetermined tension (PT) as measured by a belt-tension gauge 24 coupled to an outer portion of anchor belt 16. FIG. 18 is a diagrammatic illustration showing (from bottom to top) the shape of anchor belt 16 when it is caused to extend along the first changed belt path, the effective length of spring 58 included in force-transfer device 54 in belt tensioner 20 when anchor belt 16 is caused to extend along the first changed belt path, and the length of anchor belt 16.

As suggested in FIG. 19, child restraint 10 has moved relative to the underlying passenger seat 18 in response to, for example, application of an external load 100 to child restraint 10 (juvenile seat shell 12 has been omitted to show anchor belt 16 more clearly). The amount of downward movement of shell-support base 14 relative to bench 181 of passenger seat 18 is established by subtracting dimension D1 in FIG. 17 from dimension D2 in FIG. 19. Such downward movement of shell-support base 14 relative to passenger seat 18 can cause unexpected detensioning (i.e., loosening) of anchor belt 16 so that the tension of anchor belt 16 is less than the predetermined tension (PT).

To compensate for any movement of shell-support base 14 relative to passenger seat 18, spring 58 in force-transfer device 54 releases stored energy automatically to cause tension in belt anchor 16 to increase as suggested in FIG. 19. The central portion of anchor belt strap 163 has been pushed further into belt-receiving channel 30 by a downward force generated using energy stored in spring 58 and applied to anchor belt strap 163 by push plate 44 to change the path of anchor belt 16 further. Anchor belt 16 now extends along a second changed belt path shown, for example, in FIGS. 19 and 20 that is different from the first changed belt path shown in FIGS. 17 and 18 so as to restore anchor belt 16 to predetermined tension (PT) without any movement of actuator lever 52 relative to shell-support base 14 and while juvenile seat shell 12 remains mounted on shell-support base 14. Second surface 16S2 of anchor belt 16 is maintained above and in spaced-apart relation to underlying channel floor 302 upon movement of anchor belt 16 to extend along the second changed belt path. FIG. 20 is a diagrammatic illustration showing (from bottom to top) the shape of anchor belt 16 when it is caused to extend along the second changed belt path, the increased effected length of spring 58 included in belt tensioner 20 after it has released stored energy to apply a further downward force to the central portion of anchor belt strap 163 to change the belt path of anchor belt 16, and the unchanged length of anchor belt 16 as compared to anchor belt 16 depicted in FIGS. 17 and 18.

Figures 21, 22:
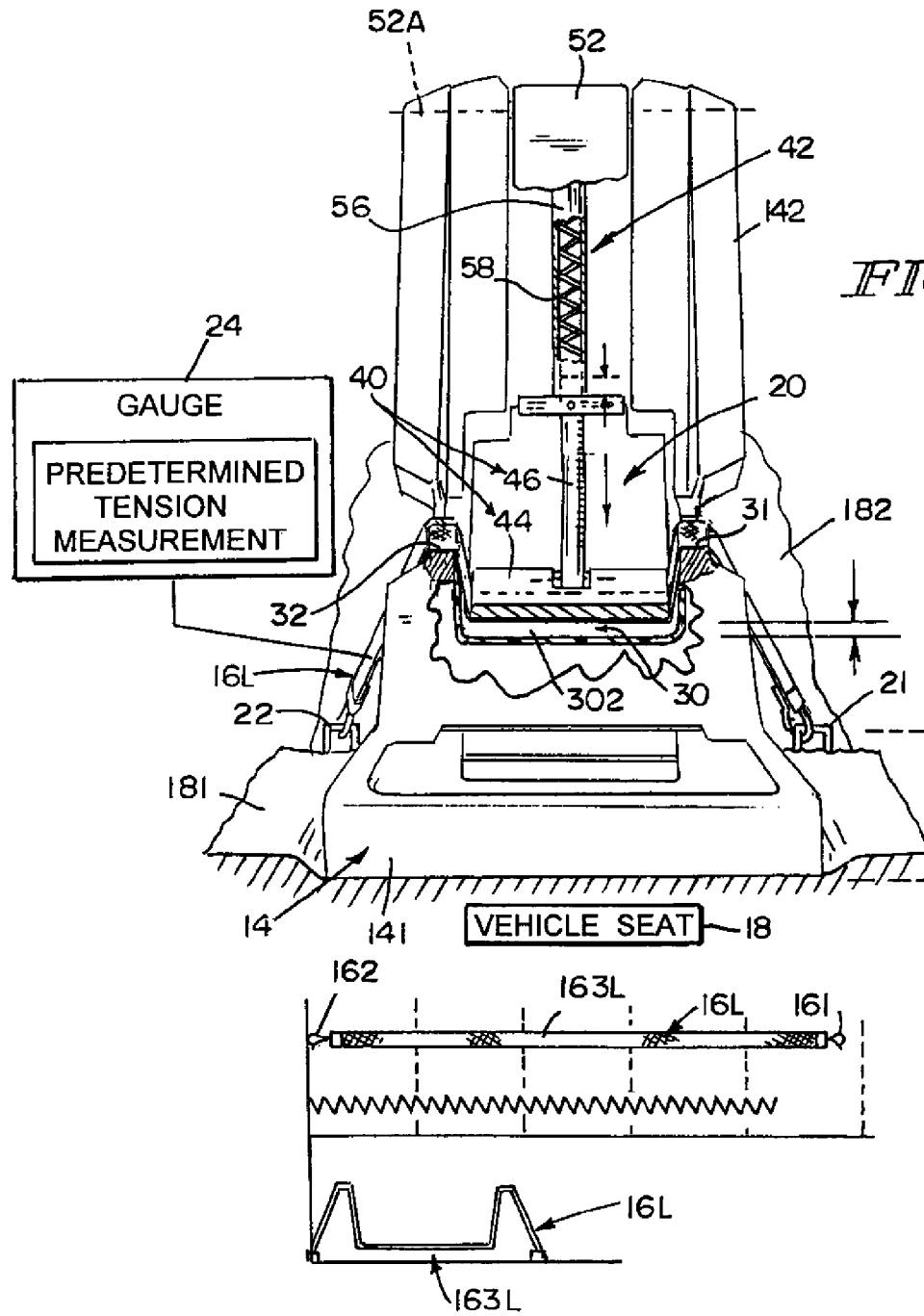
FIG. 21 is a front perspective view similar to FIG. 17 showing use of the child restraint with an anchor belt that has a relatively longer length.
FIG. 22 is a diagrammatic illustration similar to FIG. 18 showing (from top to bottom) a relatively longer anchor belt (as compared to the anchor belt depicted in FIGS. 17 and 18), the relatively longer effective length of the rod-mover spring when the anchor belt is caused to extend along a third changed belt path to increase tension in the relatively longer anchor belt to reach the predetermined tension, and the shape of the relatively longer anchor belt when it is caused to extend along the illustrated changed belt path.

A child restraint 10 with an anchor belt 16 that has a relatively longer length is shown, for example, in FIG. 21. FIG. 22 is a diagrammatic illustration showing (from top to bottom) a relatively longer anchor belt 16 (as compared to the anchor belt 16 depicted in FIGS. 17 and 18), the relatively longer effective length of spring 58 when anchor belt 16 is caused to extend along a third changed belt path to increase tension in the relatively longer anchor belt 16 to reach the predetermined tension (PT), and the shape of the relatively longer anchor belt 16 when it is caused to extend along the illustrated changed belt path.

Belt tensioner 20, as shown in FIG. 1, includes belt pusher 40, pusher-moving system 42 for moving belt pusher 40 relative to shell-support base 14, and detent means 60 for selectively engaging belt pusher 40 temporarily to block movement of belt pusher 40 relative to actuator lever 52 included in pusher-moving system 42. After actuator lever 52 has reached the final downwardly extending position to retain spring 58 in an energy-storing compressed state until any unexpected detensioning of anchor belt 16 occurs to cause tension in anchor belt 16 to be lower than the predetermined tension (PT).

Detent means 60 includes, for example, tension-locking unit 50 and a series of notches 47 formed in push rod 46. Tension-locking unit 50 is coupled to spring mount 56 to move therewith and is configured to assume an unlocked-state in response to movement of actuator lever 52 away from the final downwardly extending position as shown in FIGS. 7 and 14 to cause push rod 46 provided with notches 47 and included in belt pusher 40 to be freed to move up-and-down relative to spring mount 56. Tension-locking unit 50 is also configured to assume a locked state in response to movement of actuator lever 52 to the final downwardly extending position as shown in FIGS. 8 and 18 to cause tension-locking unit 50 to engage one of the notches 47 formed in push rod 46 of belt pusher 40 so that movement of belt pusher 40 in an upward direction is blocked.

Child restraint 10 is configured to hold a young child or infant and is provided for use with both a vehicle passenger seat 18 and anchor mounts 21, 22 (or 121, 122) provided near vehicle passenger seat 18 as suggested in FIG. 1. Child restraint 10 includes a juvenile holder 13, anchor belt 16 (or 16A or 16B), and belt tensioner 20 in an illustrative embodiment as suggested in FIG. 1. Juvenile holder 13 includes juvenile seat shell 12 and shell-support base 14 as suggested in FIG. 1. Shell-support base 14 is adapted for mounting on vehicle passenger seat 18 and arranged to support juvenile seat shell 12 in a stationary position thereon as suggested in FIG. 9.

Anchor belt 16 is arranged to overlie first and second belt-support pads 31, 32 included in shell-support base 14 and to communicate with belt-receiving channel 30 formed therebetween as suggested in FIGS. 1-4. Anchor belt 16 includes a strap 163 having opposite end portions and a central portion interconnecting the opposite end portions as suggested in FIGS. 1 and 3. Anchor belt 16 also includes first and second connectors 161, 162 as shown in FIG. 1. Each of connectors 161, 162 is coupled to one of the end portion and adapted to be coupled to one of the anchor mounts 21, 22 to establish a belt path of the anchor belt 16 relative to the first and second belt-support pads 31, 32 when the central portion of strap 163 lies on first and second belt-support pads 31, 32 and each connector (161 or 162) mates with a companion one of anchor mounts (21 or 22) following initial installation of anchor belt 16 on shell-support base 14 and to cause anchor belt 16 to produce an initial tension measurement when exposed to a belt-tension gauge 24 during an initial belt-tensioning test.

Belt tensioner 20 is coupled to shell-support base 14 and configured to include a belt pusher 40 arranged to lie above a section of the central portion of strap 163 spanning belt-receiving channel 30 and move in up-and-down relation to shell-support base 14 in a guide 441S, 442S formed in shell-support base 14 as suggested in FIGS. 4, 6-8, and 10-13. Belt tensioner 20 also includes belt-path changer means 42 for applying a downward force to belt pusher 40 to move belt pusher 40 in guide 441S, 442S in a downward direction toward foundation 141 to engage the central portion of anchor belt 16 while connectors 161, 162 included in anchor belt 16 remain coupled to anchor mounts 21, 22 and anchor belt 16 remains in contact with first and second belt-support pads 31, 32 to cause a change in the belt path of anchor belt 16 relative to first and second belt-support pads 31, 32 to establish a first changed belt path to increase tension in anchor belt 16 to produce a predetermined tension measurement that is greater than the initial tension measurement when exposed to belt-tension gauge 24 during a subsequent second belt tensioning test so that movement of shell-support base 14 and juvenile seat shell 12 coupled to shell-support base 14 relative to an underlying vehicle passenger seat 18 is limited in accordance with a predetermined specification.

Belt-path changer means 42 is configured to change the belt path of anchor belt 16 while anchor belt 16 is coupled to first and second anchor mounts 21, 22 from the initial belt path shown, for example, in FIG. 4 to a first changed belt path shown, for example, in FIGS. 8 and 9. The belt path is changed before juvenile seat shell 12 is mounted on shell support base 14 to take slack out of anchor belt 16 so as to increase tension in anchor belt 16 from an initial installation tension (IT) associated with the just-installed position of anchor belt 16 to a relatively greater predetermined tension (PT) so that movement of shell-support base 14 and juvenile seat shell 12 coupled in shell-support base 14 relative to an underlying passenger seat 18.

Belt-path changer means 42 includes an actuator 52 mounted for movement on shell-support base 14 from an inactive position to an active position shown, for example, in FIGS. 8 and 13. It is within the scope of this disclosure to mount an actuator for pivoting, sliding, twisting, or rotating movement on shell-support base 14 to cause belt pusher 40 to move to engage and deform anchor belt 16. Belt-path changer means 42 also includes a force-transfer device 54 coupled to each of belt pusher 40 and actuator 52 as suggested in FIGS. 1 and 4. Force-transfer device 54 is configured to apply the downward force to the belt pusher 40 in response to movement of actuator 52 relative to shell-support base 14 from the inactive position to the active position as suggested in FIGS. 10-13.

Force-transfer device 54 includes a spring mount 56 coupled to the actuator 52 and a spring 58 coupled to and interposed between the belt pusher 40 and the spring mount 56. Spring mount 56 includes a base coupled to actuator 52 and a tubular sleeve coupled to the base and arranged to extend toward the belt pusher 40 as shown, for example, in FIGS. 1, 4, and 10. The tubular sleeve of spring mount 56 is formed to include an interior region 57 containing the spring 58 therein during movement of actuator 52 between the inactive and active positions. Belt pusher 40 includes a push plate 44 arranged to engage the central portion of anchor belt strap 163 and a push rod 46 arranged to extend upwardly from the push plate 44 into the interior region 57 of the tubular sleeve to engage the spring 58 as suggested in FIGS. 1 and 4.

In an illustrative embodiment, actuator 52 is a lever mounted for pivotable movement on shell-support base 14 about an actuator pivot axis 52A between the inactive and active positions. The base of spring mount 56 is mounted for pivotable movement on actuator 52 about a spring-mount pivot axis 56A to allow spring mount 56 to pivot about spring-mount pivot axis 56A during pivoting movement of actuator lever 52 about actuator pivot axis 52A as suggested in FIGS. 10-13.

Shell-support base 14 is formed to include a foundation 141 adapted to set on passenger seat 18 in a vehicle 19 and to mate with juvenile seat shell 12 to support juvenile seat shell 12 on shell-support base 14 and a back 142 extending upwardly away from foundation 141 as suggested in FIGS. 1 and 4. Actuator lever 52 is sized and arranged to lie in a channel 52C formed in back 142 of shell-support base 14 in response to movement of actuator lever 52 to the active position as suggested in FIGS. 8, 19, and 13.

Back 142 of shell-support base 14 is formed to include a pair of side walls 52A, 52B arranged to lie in spaced-apart relation to one another and a floor 52F arranged to extend between side walls 52A, 52B and cooperate with side walls 52A, 52B to form boundaries of channel 52C as suggested in FIG. 4. Force-transfer device 54 is arranged to lie in channel 52C formed in the back 142 in a position between actuator lever 52 and floor 52F in response to movement of the actuator lever 52 to the active position as suggested in FIGS. 8 and 9.

Belt pusher 40 includes a push plate 44 arranged to engage the central portion of strap 163 of anchor belt 16 and a push rod 46 coupled to push plate 44 and to force-transfer device 54 as suggested in FIG. 1. Push rod 46 is arranged to transfer the downward force from force-transfer device 54 to push plate 44 during pivoting movement of the actuator 52 from the inactive position to the active position as suggested in FIGS. 10-13. A portion of push rod 46 is arranged to extend into channel 52C and lie in channel 52C during pivoting movement of actuator lever 52 from the inactive position to the active position as suggested in FIGS. 4, 6-8, and 10-13.

First side wall 52A in the shell-support base 14 includes a lower portion 44R that is formed to include a first pin-receiving slot 441S defining a guide. Belt pusher 40 further includes a first outwardly extending pin 441 arranged to extend into pin-receiving slot 441 formed in lower portion 44R of first side wall 52A and move up and down therein to guide movement of belt pusher 40 relative to shell-support base 14 during pivoting movement of actuator lever 52 between the inactive and active positions as suggested in FIGS. 4-8.

Belt-path changer means 42 includes an actuator lever 52 mounted on shell-support base 14 for pivotable movement about an actuator pivot axis 52A and two-stage belt-mover means for (1) moving belt pusher 40 in the downward direction to engage and move central portion 163 of anchor belt 16 to establish the targeted first changed belt path of anchor belt 16 and place anchor belt 16 in tension at about the predetermined tension (PT) in response to pivotable movement of actuator lever 52 about actuator pivot axis 52A during a first actuation stage relative to shell-support base 14 and (2) storing energy during such pivotable movement of actuator lever 52 that is later released in a subsequent second actuation stage in response to any unexpected detensioning of anchor belt 16 sufficient to change tension in anchor belt 16 to a magnitude that is less than the predetermined tension (PT) to move belt pusher 40 further in the downward direction to move central portion 163 of anchor belt 16 to establish a second changed belt path of anchor belt 16 to a tensioned condition characterized by the predetermined tension (PT) without any movement of actuator lever 52 relative to shell-support base 14.

The two-stage belt mover means 42 includes a spring mount 56 coupled to actuator lever 52 for pivotable movement about a mount pivot axis 56A during pivoting movement of actuator lever 52 about actuator pivot axis 52A and a spring 58 coupled to and interposed between belt pusher 40 and spring mount 56. Spring 58 is configured to apply the downward force to belt pusher 40 during pivoting movement of actuator lever 52 from an initial outwardly extending position extending away from the belt pusher 40 suggested in FIGS. 4 and 10 to a final downwardly extending position extending toward belt pusher 40 and the central portion of anchor belt strap 163 as suggested in FIGS. 8 and 13. Spring 58 is also configured to store energy during movement of actuator lever 52 from the initial outwardly extending position to the final downwardly extending position in the first actuation stage which energy is later released in the subsequent second actuation stage. Push plate 44 is arranged to engage the central portion of anchor belt strap 163 and a push rod 46 coupled to push plate 44 and to spring 58. Push rod 46 is arranged to transfer the downward force from spring 58 to push plate 44 during each of the first and second actuation stages.

Spring 58 is an elastic compressible energy-storage spring configured to store energy during movement of actuator lever 52 from the initial outwardly extending position to the final downwardly extending position in the first actuation stage which energy is later released in the subsequent second actuation stage as suggested in FIGS. 10-13 and 17-20. Push plate 44 is arranged to engage the central portion of anchor belt strap 163 and a push rod 46 coupled to push plate 44 and to spring 58. Push rod 46 is arranged to transfer the downward force from spring 58 to push plate 44 during each of the first and second actuation stages. In an illustrative embodiment, spring 58 is a coiled compression spring.

Spring mount 56 further includes a flange 56F coupled to tubular sleeve 56S and arranged to extend into the interior region 57 as suggested in FIGS. 4, 10, 17, and 19. Spring 58 includes an upper end coupled to flange 56F and a lower end coupled to belt pusher 40 as suggested in FIGS. 4 and 10. Spring 58 is compressed between flange 56F and the belt pusher 40 to store energy during the first actuation stage in response to movement of the belt pusher 40 toward the flange 56F as suggested in FIGS. 7, 8, 11, 12, 17, and 18. Spring 58 is decompressed to release energy automatically during the subsequent second actuation stage in response to movement of the belt pusher 40 away from the flange 56F as suggested in FIGS. 19 and 20. Push rod 46 is arranged to extend into the interior region 57 of the tubular sleeve 56S to mate with the lower end of the spring 58 through a downwardly facing rod-receiving aperture opening into the interior region 57 formed in the tubular sleeve 56S as suggested in FIG. 10.

Spring 58 is an elongated coiled compression spring having an upper end located in close proximity to the actuator lever 52 and lower end arranged to extend toward the central portion of anchor belt strap 163 and lie between the mount pivot axis 56A and the belt pusher 40 as suggested in FIG. 10. Spring 58 is compressed to store energy during change of anchor belt 16 from the initial belt path to the first changed belt path as suggested in FIGS. 10-13.

Belt tensioner 20 further includes detent means 60 for selectively engaging belt pusher 40 temporarily to block movement of belt pusher 40 relative to actuator lever 52 after actuator lever 52 has reached the final downwardly extending position to retain spring 58 in an energy-storing compressed state between belt pusher 40 and spring mount 56 until any unexpected detensioning of anchor belt 16 occurs to cause tension in anchor belt 16 to be lower than predetermined tension (PT). At that time, detent means 60 disengages belt pusher 40 in response to exposure to the downward force generated by release of energy stored in spring 58 to allow belt pusher 40 to move further in the downward direction in response to exposure to the downward force applied by spring 58 to move anchor belt 16 relative to shell-support base 14 to extend along the second changed belt path to restore anchor belt 16 to the tensioned condition characterized by the predetermined tension (PT).

Figure 26:
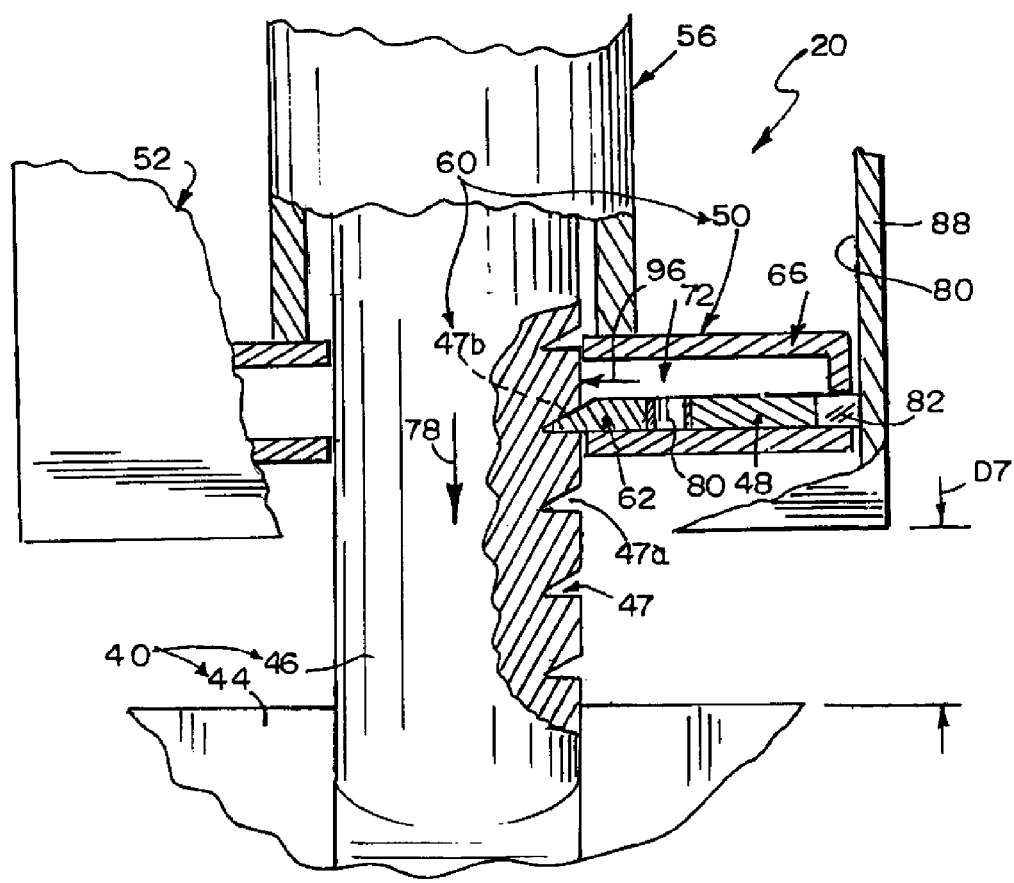

Detent means 60 includes, for example, tension-locking unit 50 and a series of notches 47 formed in push rod 46 to lie in spaced-apart relation to one another as suggested in FIGS. 14 and 26. Tension-locking unit 50 is coupled to spring mount 56 to move therewith and is configured to assume an unlocked-state in response to movement of actuator lever 52 away from the final downwardly extending position as shown in FIGS. 7 and 14 to cause push rod 46 included in belt pusher 40 to be freed to move up-and-down relative to spring mount 56. Tension-locking unit 50 is also configured to assume a locked state in response to movement of actuator lever 52 to the final downwardly extending position as shown in FIGS. 8 and 18 to cause tension-locking unit 50 to extend into notch 47 formed in push rod 46 of belt pusher 40 to mate with push rod 46 so that movement of belt pusher 40 in an upward direction is blocked.

Tension-locking unit 50 illustratively includes movable lock plate 48, a tooth 62, and a tooth spring 64, as shown, for example, in FIGS. 23-26. Lock plate 48 is coupled to spring mount 56 to move back and forth relative to spring mount 56. Tooth 62 is coupled to lock plate 48 to move back and forth relative to lock plate 48. Tooth spring 64 is positioned to lie between and to interconnect tooth 62 and lock plate 48 to cause a bias force provided by tooth spring 64 to urge tooth 62 to move into engagement with notch 47 included in belt pusher 40 to mate with push rod 46 when tension-locking unit 50 is in the locked state.

Notch 47 is defined by an angled cam surface 471 and a notch-lock surface 472 as shown in FIG. 24. Notch-lock surface 472 is generally parallel to cam surface 471 is arranged to define an acute angle between notch-lock surface 472 and cam surface 471.

Tooth 62 includes a cam-follower surface 621 and a tooth-lock surface 622 as shown in FIG. 24. Tooth-lock surface 622 is arranged to lie in generally spaced-apart parallel relation to notch-lock surface 472 and cam-follower surface 621 is arranged to define an acute angle between tooth-lock surface 622 and cam-follower surface 621. As illustrated in FIG. 24, cam-follower surface 621 of tooth 62 is arranged to lie in substantially spaced-apart parallel relation to cam surface 471 associated with notch 47. As shown in FIG. 23, tooth 62 is configured to extend into notch 47 of push rod 46 when tension-locking unit 50 is in the locked state and notch-lock surface 472 and tooth-lock surface 622 are arranged to lie in confronting relation to cause upward movement of push rod 46 and notch 47 relative to tooth 62 to be blocked.

As a result of cam surface 471 and cam-follower surface 621 being arranged to lie in confronting relation to one another, downward movement of push plate 44 is permitted as suggested in FIG. 23. As shown in FIG. 24, movement of belt pusher 40 in the downward direction by spring 58 causes tooth 62 to slide in a second direction 97 away from notch 47a against the bias force provided by tooth spring 64. After tooth 62 has exited notch 47 completely to disengage push rod 46, belt pusher 40 will continue to move downward until the bias force provided by tooth spring 64 urges tooth 62 into another notch 47b as shown in FIG. 26 so that any upward movement of belt pusher 40 is blocked. Tooth 62 will continue to block upward movement of belt pusher 40 until actuator lever 52 is moved away from the downwardly extending position to cause tension-locking unit 50 to assume the unlocked state as shown in FIG. 14.

Prior to movement of belt pusher 40 in downward direction 78, a first distance D6 is established between the bottom of actuator lever 52 and the top of push plate 44 as shown in FIG. 23. After movement of belt pusher 40 in downward direction 78, a relatively larger second distance D7 is established. As an example, the difference between first distance D6 and relatively larger distance D7 is the distance between notches 47a and 47b and is also the distance used to remove excess slack in anchor belt 16.

Figure 15:
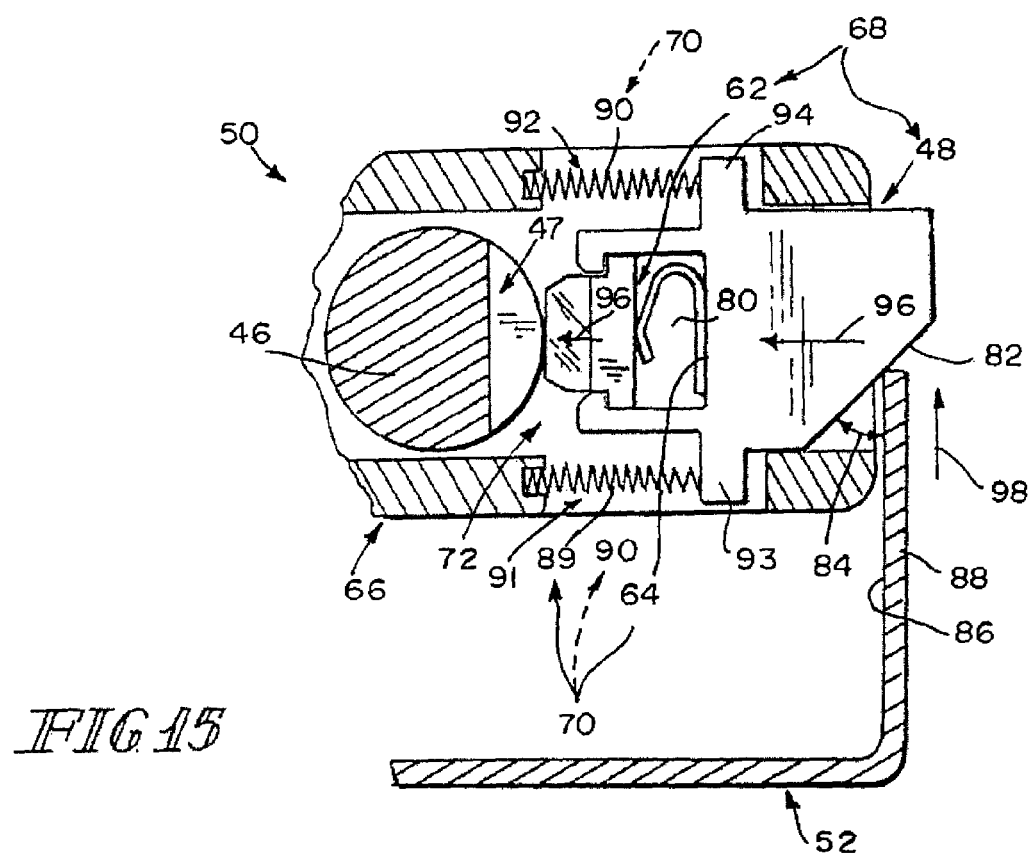
FIG. 15 is an enlarged sectional view taken along line 15-15 of FIG. 14.
Figure 16:
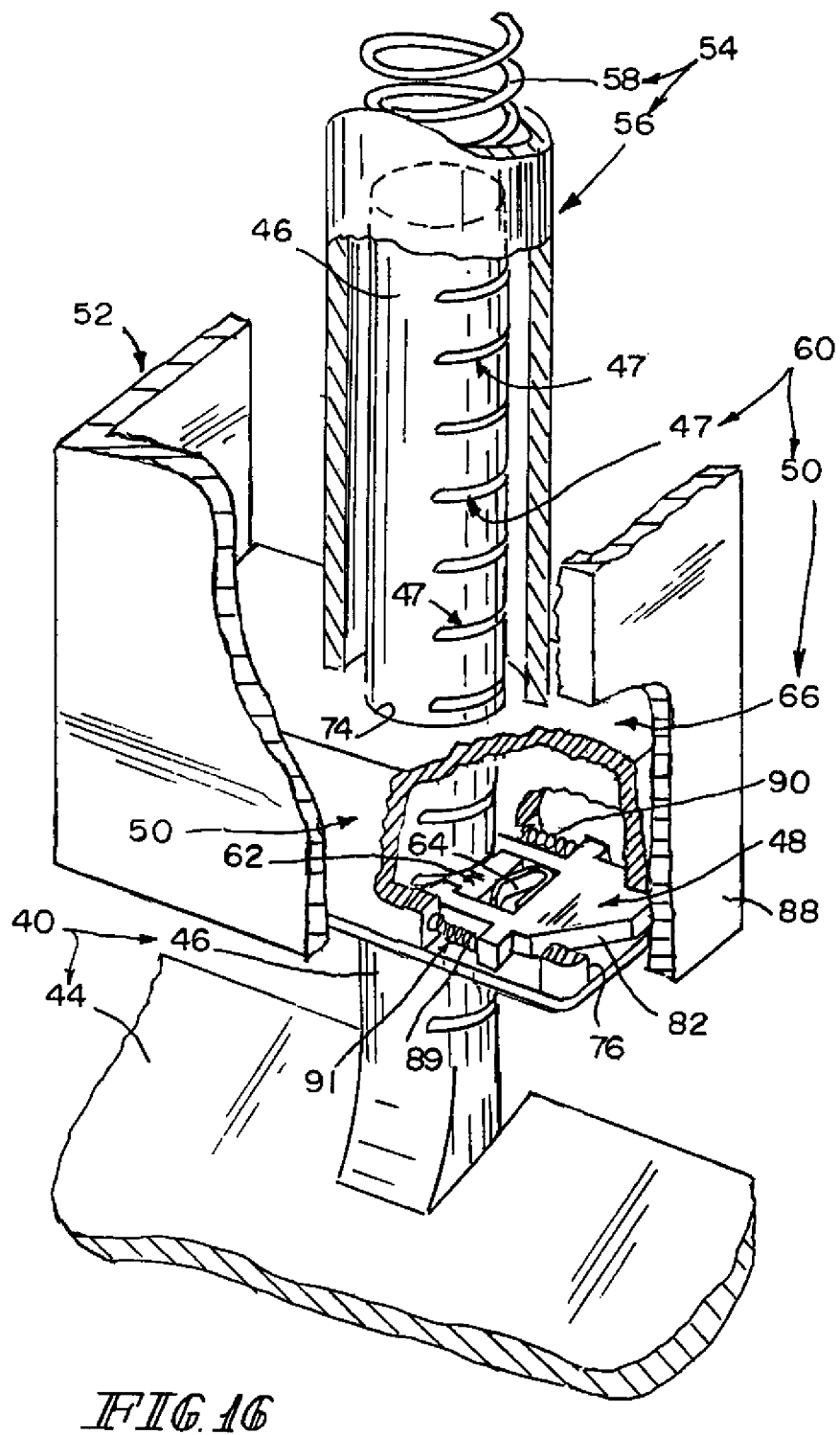
FIG. 16 is an enlarged perspective view of a portion of the belt tensioner shown in the circled area of FIG. 8, with portions broken away, to show engagement of a spring-biased lock plate included in the tension-locking unit in one of the notches formed in the upwardly extending notched push rod included in the belt pusher.

Tension-locking mechanism 50 illustratively includes a housing 66, a lock 68, and a bias mechanism 70 as shown, for example, in FIG. 14. Housing 66 is coupled to spring mount 56 of belt pusher 40 to move therewith. Lock 68 is coupled to housing 66 to move back and forth relative to housing 66. Bias mechanism 70 is configured to provide a bias force to lock 70 urging lock 70 out of engagement with push rod 46 when tension-locking mechanism 50 is in the unlocked state as shown in FIGS. 14 and 15, and provides a bias force to lock 70 urging lock 70 into engagement with push rod 46 when tension-locking mechanism 50 is in the locked state as shown in FIGS. 16 and 23-26.

Housing 66 is formed to include a lock space 72, a pair of push-rod apertures 74, 75 opening into lock space 72, and a lock aperture 76 as suggested in FIG. 14 and shown in FIG. 23. Push rod 46 is positioned to lie in apertures 74, 75 and extend through lock space 72.

During use, lock 68 is arranged to lie in lock space 72 and configured to selectively engage the portion of push rod 46 arranged to lie in lock space 72 when tension-locking mechanism 50 is in the locked state, as shown in FIGS. 16 and 23-26. In contrast, lock 68 is arranged to lie in spaced-apart relation to push rod 46 and to extend out of lock space 72 a distance D8 through lock aperture 76 when tension-locking mechanism 50 is in the unlocked state, as shown in FIGS. 14 and 15.

Lock 68, as shown in FIG. 14, includes movable lock plate 48 and tooth 62. During movement of tension-locking mechanism 50 from the unlocked state to the locked state, lock plate 48 and tooth 62 move together in a first direction 96 toward push rod 46 as shown in FIG. 15. While tension-locking mechanism 52 is in the locked state, lock plate 48 is constrained to lie in lock space 72 in a stationary position as shown in FIGS. 16 and 23-26, but tooth 62 is permitted to move back and forth relative to lock plate 48 in response to movement in downward direction 78 of push rod 46 as shown in FIGS. 23 and 24.

Lock plate 48, as shown in FIG. 15, is formed to include a tooth slot 80 and a ramp surface 82. Tooth 62 is positioned to lie in tooth slot 80 and be guided by tooth slot 80 during back-and-forth movement of tooth 62. Ramp surface 82 is configured to define an acute angle 84, as shown in FIGS. 15 and 25, between ramp surface 82 and an inside surface 86 of right wall 88 of actuator lever 52. As actuator lever 52 moves from the upwardly extending position to the final downwardly extending position, right wall 88 of actuator lever 52 moves in a rearward direction 98 to engage ramp surface 82 of lock plate 48 to cause lock plate 48 to move in first direction 96 toward push rod 46, as shown in FIG. 15, so that tension-locking mechanism 50 assumes the locked state.

Bias mechanism 70 includes tooth spring 64 and a pair of return springs 89, 90 as illustrated in FIGS. 14 and 15. As described previously, tooth spring 64 provides the bias force to tooth 62 to extend into notch 47 formed in push rod 46. As shown in FIG. 15, tooth spring 62 is arranged to lie in tooth slot 80 between tooth 62 and ramp surface 82. Return springs 89, 90 are configured to provide a return force to lock plate 48 to cause lock plate 48 to move in an opposite direction 97 away from push rod 46 after actuator lever 52 moves away from the final downwardly extending position toward the upwardly extending position so that push rod 46 is free to move in the upward direction.

Return spring 89 is positioned to lie in a spring slot 91 formed in housing 66 as suggested in FIG. 25. Return spring 90 is similarly positioned to lie in associated spring slot 92 as also suggested in FIG. 25. Illustratively, return spring 89 extends between housing 66 and a first tab 93 included in lock plate 48. Return spring 90 is similarly arranged to extend between housing 66 and a second tab 94 also included in lock plate 48.

As shown in FIG. 10, when actuator lever 52 of is the upwardly extending initial position, an initial distance D3 between spring-mount pivot axis 56A and push plate 44 is defined. At the same instance, spring 58 of force-transfer device 54 has an initial spring length S1. As illustrated in FIG. 11, actuator lever 52 has begun to rotate about spring-mount pivot axis 56A in counterclockwise direction 52CCW and push plate 44 has engaged and begun to move anchor belt 16. At this instance, distance D1 between spring-mount pivot axis 56A and push plate 44 remains substantially unchanged and spring length S1 remains substantially unchanged. As shown in FIG. 12, actuator lever 52 has continued rotating about spring-mount pivot axis 56A toward the downwardly extending final position. As a result, a relatively smaller intermediate dimension D4 is established between spring-mount pivot axis 56A and push plate 44 and a relatively smaller intermediate spring length S2 is established. As shown in FIG. 12, actuator lever 52 has moved to the downwardly extending final position. As a result, a relatively smaller final dimension D5 is established between spring-mount pivot axis 56A and push plate 44 and a relatively smaller final spring length S3 is established.

In use, actuator lever 52 is accessed on a front portion of shell-support base 14 by a caregiver as suggested in FIGS. 4-8 and 10-13. A lever lock (not shown) is released by the caregiver to allow actuator lever 52 to be moved upwardly relative to shell-support base 14 from the active position shown in FIGS. 8 and 13 to the inactive position shown in FIGS. 4 and 10. Opening actuator lever 52 in this manner raises belt pusher 40 upward to an easily accessible location ready for feeding anchor belt 16 under belt pusher 40.

Next, anchor belt 16 is fed through a passageway below belt pusher 40 and above belt-support pads 31, 32. These belt-support pads 31, 32 are located on outer sides of shell-support base 14 in line with anchor mounts 21, 22 associated with passenger seat 18 to help guiding anchor belt 16 relative to shell-support base 14.

After anchor belt 16 is fed through the passageway under belt pusher 40, anchor belt 16 is coupled to companion anchor mounts such as anchor mounts 21, 22 (or other suitable anchor mounts). Actuator lever 52 then is moved downwardly giving mechanical advantage to the caregiver. Actuator lever 52 drives force-transfer device 54 to move belt pusher 40 along a guide 441S, 442S toward an underlying portion of anchor belt 16 to contact anchor belt 16 and change the path of anchor belt 16. As actuator lever 52 closes and locks, belt pusher 40 tensioning between two outer fixed contact points established, for example, by belt-support pads 31, 32 progressively adds more force to anchor belt 16 until correct tension is achieved. Any leftover tension force gets compressed into energy-storage spring 58 included in force-transfer device 54 for supplemental tension if needed later.

In the active (i.e., closed) position, actuator lever has pushed force-transfer device 54 and belt pusher 40 to cause the anchor belt 16 to deviate (i.e., change) from its initial belt path taking up to, for example, seven to eight inches of any belt slack and applying increased tension to anchor belt 16 until correct tension is indicated or until clutched out due to over tension.

Energy-storage spring 58 stores spring compression while actuator lever 52 is used. Stored spring tension adds tension back to belt pusher 40 to urge belt pusher 40 against anchor belt 16 if a loss of tension occurs unexpectedly, keeping anchor belt 16 tensioned properly. Energy-storage spring 58 stores supplemental load and releases force to belt pusher 40 and thus to anchor belt 16 without caregiver input to maintain belt tension under, for example, changing temperatures that may affect passenger seat foam compression conditions.

The invention claimed is:

1. A child restraint is provided for use with both a vehicle passenger seat and anchor mounts provided near the vehicle passenger seat, the child restraint comprising a juvenile holder including a juvenile seat shell and a shell-support base, the shell-support base having a foundation adapted to set on a bench included in a passenger seat in a vehicle and a back extending upwardly from the foundation along an upright backrest included in the passenger seat in the vehicle, the foundation being formed to include a first belt-support pad and a second belt-support pad arranged to lie in spaced-apart relation to the first belt-support pad to form a belt-receiving channel therebetween, the foundation of the shell-support base being arranged to support the juvenile seat shell in a stationary position thereon, an anchor belt arranged to overlie the first and second belt-support pads and to communicate with the belt-receiving channel therebetween, the anchor belt including a strap having opposite end portions and a central portion interconnecting the opposite end portions and lying on the first and second belt-support pads to form a bridge spanning the belt-receiving channel and a connector coupled to each end portion and adapted to be coupled to one of the anchor mounts to establish a belt path of the anchor belt relative to the first and second belt-support pads when the central portion of the strap lies on the first and second belt-support pads and each connector mates with a companion one of the anchor mounts following initial installation of the anchor belt on the shell-support base to assume a just-installed position and to cause the anchor belt to produce an initial tension measurement when exposed to a belt-tension gauge during an initial belt-tensioning test, and a belt tensioner coupled to the back of the shell-support base and configured to include a belt pusher arranged to lie above a section of the central portion of the strap spanning the belt-receiving channel and move in up-and-down relation to the shell-support base in a guide formed in the back of the shell-support base and belt-path changer means for applying a downward force to the belt pusher to move the belt pusher in the guide in a downward direction toward the foundation to engage the central portion of the anchor belt before the juvenile seat shell is coupled to the foundation of the shell-support base and while the connectors included in the anchor belt remain coupled to the anchor mounts and the anchor belt remains in contact with the first and second belt-support pads to cause a change in the belt path of the anchor belt relative to the first and second belt-support pads to establish a first changed belt path to increase tension in the anchor belt to produce a predetermined tension measurement that is greater than the initial tension measurement when exposed to the belt-tension gauge during a subsequent second belt-tensioning test so that movement of the shell-support base and the juvenile seat shell coupled to the foundation of shell-support base relative to an underlying vehicle passenger seat is limited in accordance with a predetermined specification.

2. The child restraint of claim 1, wherein the anchor belt includes a first surface arranged to be engaged by the belt pusher during movement of the belt pusher in the downward direction toward the foundation, the anchor belt also includes an opposite second surface, and the second surface of the central portion of the anchor belt is arranged to lie above and in spaced-apart relation to any underlying portion of the foundation upon movement of the anchor belt to extend along the first changed belt path so that a space is provided between the second surface of the central portion of the anchor belt and the foundation.

3. The child restraint of claim 2, wherein the belt-receiving channel is defined in part by a floor lying below and facing upwardly toward the second surface of the central portion of the anchor belt and extending between the first and second belt-support pads and the second surface of the central portion of the anchor belt is arranged to lie above and in spaced-apart relation to the floor upon movement of the anchor belt to extend along the first changed belt path.

4. The child restraint of claim 1, wherein the back of the shell-support base is formed to include a channel extending upwardly away from the foundation and the belt-path changer means includes an actuator mounted for movement on the back of the shell-support base from an inactive position to an active position and a force-transfer device coupled to each of the belt pusher and the actuator and configured to apply the downward force to the belt pusher in response to movement of the actuator relative to the back of the shell-support base from the inactive position to the active position and the actuator is sized and arranged to lie in the channel formed in the back of the shell-support base in response to movement of the actuator to the active position.

5. The child restraint of claim 4, wherein the back is formed to include a pair of side walls arranged to lie in spaced-apart relation to one another and a floor arranged to extend between the side walls and cooperate with the side walls to form boundaries of the channel and the force-transfer device is arranged to lie in the channel formed in the back in a position between the actuator and the floor in response to movement of the actuator to the active position.

6. The child restraint of claim 5, wherein the belt pusher includes a push plate arranged to engage the central portion of the strap of the anchor belt and a push rod coupled to the push plate and to the force-transfer device and arranged to transfer the downward force from the force-transfer device to the push plate during pivoting movement of the actuator from the inactive position to the active position and a portion of the push rod is arranged to extend into the channel and lie in the channel during pivoting movement of the actuator from the inactive position to the active position.

7. The child restraint of claim 5, wherein the belt pusher includes a push plate arranged to engage the central portion of the strap of the anchor belt and a push rod coupled to the push plate and to the force-transfer device and arranged to transfer the downward force from the force-transfer device to the push plate during pivoting movement of the actuator from the inactive position to the active position, a first of the side walls included in the back of the shell-support base is formed to include a pin-receiving slot defining the guide, and the belt pusher further includes an outwardly extending pin coupled to the push plate and arranged to extend into the pin-receiving slot formed in the first of the side walls and move up and down therein to guide movement of the belt pusher relative to the back of the shell-support base during pivoting movement of the actuator between the inactive and active positions.

8. The child restraint of claim 1, wherein the belt-path changer means includes an actuator lever mounted for pivotable movement on the back of the shell-support base about an actuator pivot axis from an inactive position associated with an initial belt path corresponding to the just-installed position of the anchor belt to an active position associated with the first changed belt path of the anchor belt and a force-transfer device coupled to the actuator lever for pivotable movement about a mount pivot axis and coupled to the belt pusher and configured to apply the downward force to the belt pusher in response to pivoting movement of the actuator lever about the actuator pivot axis relative to the back of the shell-support base from the inactive position to the active position.

9. The child restraint of claim 8, wherein the back of the shell-support base is formed to include a pin-receiving slot defining the guide and the belt pusher further includes a push plate arranged to lie above and engage the central portion of the anchor belt and an outwardly extending pin coupled to the push plate and arranged to extend into the pin-receiving slot and move up and down therein to guide movement of the belt pusher relative to the back of the shell-support base during pivoting movement of the actuator lever about the actuator pivot axis between the inactive and active positions.

10. The child restraint of claim 8, wherein the force-transfer device includes a spring mount coupled to the actuator lever and a spring coupled to and interposed between the belt pusher and the spring mount.

11. The child restraint of claim 10, wherein the spring mount includes a base coupled to the actuator lever and a sleeve coupled to the base and arranged to extend toward the belt pusher and formed to include an interior region containing the spring therein during movement of the actuator between the inactive and active positions.

12. The child restraint of claim 11, wherein the belt pusher includes a push plate arranged to engage the central portion of the strap of the anchor belt and a push rod arranged to extend upwardly from the push plate into the interior region of the sleeve to engage the spring.

13. The child restraint of claim 12, wherein the actuator lever is mounted for pivotable movement on the back of the shell-support base about an actuator pivot axis between the inactive and active positions and the base of the spring mount is mounted for pivotable movement on the actuator lever about a mount pivot axis to allow the spring mount to pivot about the mount pivot axis during pivoting movement of the actuator lever about the actuator pivot axis.

14. The child restraint of claim 8, wherein the force-transfer device includes an upper end coupled to the actuator lever at the mount pivot axis and an opposite lower end and the belt pusher includes a push plate arranged to engage the central portion of the strap of the anchor belt and a push rod arranged to extend upwardly from the push plate to engage the lower end of the force-transfer device.

15. The child restraint of claim 14, wherein the push rod is arranged to extend along a reference line intersecting each of the actuator pivot axis and mount pivot axis upon movement of the actuator lever to assume the active position.

16. The child restraint of claim 14, wherein the back of the shell-support base is formed to include a pin-receiving slot defining the guide and the belt-pusher further includes an outwardly extending pin coupled to the push plate and arranged to extend into the pin-receiving slot and move up and down therein to guide movement of the belt pusher relative to the back of the shell-support base during pivoting movement of the actuator lever about the actuator pivot axis between the inactive and active positions.

17. The child restraint of claim 14, wherein the belt pusher is mounted for up-and-down movement in a central channel formed in the back of the shell-support base and defined between spaced-apart left-side and right-side side walls included in the back of the shell-support base and wherein up-and-down movement of the push plate is guided by sliding motion of first and second outwardly extending pins included in the belt pusher and coupled to the push plate in companion guide slots formed in the left-side and right-side side walls to define the guide.

18. The child restraint of claim 17, wherein the belt pusher is mounted for up-and-down movement in a central channel formed in the back of the shell-support base and defined between spaced-apart left-side and right-side side walls included in the back of the shell-support base and wherein up-and-down movement of the push plate is guided by sliding motion of first and second outwardly extending pins included in the belt pusher and coupled to the push plate in companion guide slots formed in the left-side and right-side side walls to define the guide.

19. The child-restraint of claim 14, wherein the actuator lever is formed to include an interior region and the force-transfer device is arranged to lie in the interior region of the actuator lever upon movement of the actuator lever to the active position.

20. The child-restraint of claim 19, wherein the actuator lever is formed to include a bottom aperture opening into the interior region formed in the actuator lever and facing toward the back of the shell-support base upon movement of the actuator lever to the active position to allow the force-transfer device to pass into the interior region formed in the actuator lever through the bottom aperture during pivoting movement of the actuator lever about the actuator pivot axis from the inactive position to the active position.

21. The child restraint of claim 19, wherein a portion of the push rod is arranged to extend into the interior region formed in the actuator lever upon movement of the actuator lever to the active position.

22. The child restraint of claim 14, wherein the back is arranged to terminate along a top edge arranged to lie in spaced-apart relation to the foundation and the actuator pivot axis is located in close proximity to the top edge of the back of the shell-support base.

23. The child restraint of claim 22, wherein the back is formed to include a forwardly opening channel extending from about the top edge downwardly toward the foundation and the actuator lever is sized and shaped to lie in the forwardly opening channel to locate the force-transfer device in the forwardly opening channel in a space provided between the actuator lever and the back of the shell-support base upon movement of the actuator lever to the active position.

24. The child restraint of claim 22, wherein the actuator lever includes a proximal portion coupled to the back along the actuator pivot axis and an opposite distal portion and the force-transfer device is arranged to lie in a space provided between the actuator pivot axis and the opposite distal portion of the actuator lever upon movement of the actuator lever to the active position.

25. The child restraint of claim 22, wherein the actuator lever is formed to include an interior region and the force-transfer device is arranged to lie in the interior region formed in the actuator lever upon movement of the actuator lever to the active position.

26. A child restraint comprising
a juvenile holder including a shell-support base having a foundation adapted to set on a bench included in a passenger seat in a vehicle in close proximity to first and second anchor mounts included in the vehicle and a back extending upwardly from the foundation and a juvenile seat shell adapted to be coupled to the shell-support base, the back of the shell-support base having a rear face adapted to face toward a backrest included in the passenger seat and arranged to extend upwardly from the bench and a front face arranged to face toward the juvenile seat shell when the juvenile seat shell is coupled to the shell-support bases base,
an anchor belt including a first connector adapted to be coupled to the first anchor mount, a second connector adapted to be coupled to the second anchor mount, and a strap arranged to extend between the first and second anchor mounts and lie on the shell-support base along an initial belt path when the first connector is coupled to the first anchor mount and the second connector is coupled to the second anchor mount to establish a just-installed position of the anchor belt on the shell-support base, and
a belt tensioner coupled to the front face of the back of shell-support base, the belt tensioner including belt-path changer means for changing the belt path of the anchor belt before the juvenile seat shell is coupled to the shell-support base and while the anchor belt is coupled to the first and second anchor mounts from the initial belt path to a first changed belt path to take slack out of the anchor belt so as to increase tension in the anchor belt from an initial installation tension associated with the just-installed position of the anchor belt to a relatively greater predetermined tension so that movement of the shell-support base and the juvenile seat shell coupled to the shell-support base relative to an underlying passenger seat in a vehicle is limited in accordance with a predetermined specification, wherein the belt-path changer means includes an actuator lever mounted on the back for pivotable movement about an actuator pivot axis, a belt pusher arranged to lie between the foundation and the actuator pivot axis and above the strap of the anchor belt, and a force-transfer device arranged to interconnect the belt pusher and the actuator lever and extend in an upward direction away from the foundation toward the actuator lever.

27. The child restraint of claim 26, wherein the anchor belt includes a first surface arranged to be engaged by the belt pusher during movement of the belt pusher in the downward direction toward the foundation, the anchor belt also includes an opposite second surface, and the second surface of the central portion of the anchor belt is arranged to lie above and in spaced-apart relation to any underlying portion of the foundation upon movement of the anchor belt to extend along the first changed belt path so that a space is provided between the second surface of the central portion of the anchor belt and the foundation.

28. A child restraint comprising
a juvenile holder including a shell-support base including a foundation adapted to set on a passenger seat in a vehicle in close proximity to first and second anchor mounts included in the vehicle and a juvenile seat shell adapted to be coupled to the foundation of the shell-support base,
an anchor belt including a first connector adapted to be coupled to the first anchor mount, a second connector adapted to be coupled to the second anchor mount, and a strap arranged to extend between the first and second anchor mounts and lie on the shell-support base along an initial belt path when the first connector is coupled to the first anchor mount and the second connector is coupled to the second anchor mount to establish a just-installed position of the anchor belt on the shell-support base, and
a belt tensioner coupled to a back of the shell-support base that is arranged to extend upwardly from the foundation, wherein the belt tensioner is configured to include a belt pusher, a pivotable actuator lever separated from the belt pusher and mounted on the back of the shell-support base, and means for using the belt pusher in response to pivoting movement of the pivotable actuator lever toward the foundation to move the anchor belt downwardly relative to the shell-support base toward a portion of the passenger seat underlying the shell-support base before the juvenile seat shell is coupled to the foundation of the shell-support base and while the anchor belt is coupled to the first and second anchor mounts and a portion of the anchor belt remains in contact with a portion of the shell-support base from the initial belt path to a first changed belt path to take slack out of the anchor belt so as to increase tension in the anchor belt from an initial installation tension associated with the just-installed position of the anchor belt to a relatively greater predetermined tension so that movement of the shell-support base and the juvenile seat shell later coupled to the foundation of the shell-support base relative to an underlying passenger seat in a vehicle is limited in accordance with a predetermined specification.

29. A child restraint is provided for use with both a vehicle passenger seat and anchor mounts provided near the vehicle passenger seat, the child restraint comprising
a juvenile holder including a juvenile seat shell and a shell-support base formed to include a first belt-support pad and a second belt-support pad arranged to lie in spaced-apart relation to the first belt-support pad to form a belt-receiving channel therebetween, the shell-support base being adapted for mounting on the vehicle passenger seat and arranged to support the juvenile seat shell in a stationary position thereon,
an anchor belt arranged to overlie the first and second belt-support pads and to communicate with the belt-receiving channel therebetween, the anchor belt including a strap having opposite end portions and a central portion interconnecting the opposite end portions and lying on the first and second belt-support pads to form a bridge spanning the belt-receiving channel and a connector coupled to each end portion and adapted to be coupled to one of the anchor mounts to establish a belt path of the anchor belt relative to the first and second belt-support pads when the central portion of the strap lies on the first and second belt-support pads and each connector mates with a companion one of the anchor mounts following initial installation of the anchor belt on the shell-support base to assume a just-installed position and to cause the anchor belt to produce an initial tension measurement when exposed to a belt-tension gauge during an initial belt-tensioning test, and a belt tensioner coupled to the shell-support base and configured to include a belt pusher arranged to lie above a section of the central portion of the strap spanning the belt-receiving channel and move in up-and-down relation to the shell-support base in a guide formed in the shell-support base and belt-path changer means for applying a downward force to the belt pusher to move the belt pusher in the guide in a downward direction to engage the central portion of the anchor belt before the juvenile seat shell is coupled to the shell-support base and while the connectors included in the anchor belt remain coupled to the anchor mounts and the anchor belt remains in contact with the first and second belt-support pads to cause a change in the belt path of the anchor belt relative to the first and second belt-support pads to establish a first changed belt path to increase tension in the anchor belt to produce a predetermined tension measurement that is greater than the initial tension measurement when exposed to the belt-tension gauge during a subsequent second belt-tensioning test so that movement of the shell-support base and the juvenile seat shell coupled to the shell-support base relative to an underlying vehicle passenger seat is limited in accordance with a predetermined specification, wherein the belt-path changer means includes an actuator lever mounted for pivotable movement on the shell-support base about an actuator pivot axis from an inactive position associated with an initial belt path corresponding to the just-installed position of the anchor belt to an active position associated with the first changed belt path of the anchor belt and a force-transfer device coupled to the actuator lever for pivotable movement about a mount pivot axis and coupled to the belt pusher and configured to apply the downward force to the belt pusher in response to pivoting movement of the actuator lever about the actuator pivot axis relative to the shell-support base from the inactive position to the active position, wherein the force-transfer device includes an upper end coupled to the actuator lever at the mount pivot axis and an opposite lower end and the belt pusher includes a push plate arranged to engage the central portion of the strap of the anchor belt and a push rod arranged to extend upwardly from the push plate to engage the lower end of the force-transfer device, and wherein the actuator lever is formed to include an interior region and the force-transfer device is arranged to lie in the interior region of the actuator lever upon movement of the actuator lever to the active position.

30. The child restraint of claim 29, wherein the actuator lever is formed to include an interior region and a bottom aperture opening into the interior region formed in the actuator lever and facing toward the back of the shell-support base upon movement of the actuator lever to the active position to allow the force-transfer device to pass into the interior region formed in the actuator lever through the bottom aperture during pivoting movement of the actuator lever about the actuator pivot axis from the inactive position to the active position.

31. The child restraint of claim 29, wherein a portion of the push rod is arranged to extend into an interior region formed in the actuator lever upon movement of the actuator lever to the active position.

* * * * *